United States Patent
Wang et al.

(10) Patent No.: US 10,841,202 B2
(45) Date of Patent: Nov. 17, 2020

(54) DISTRIBUTION OF COMPUTING RESOURCES OF A RADIO ACCESS NETWORK

(71) Applicant: Fujitsu Limited, Kawasaki (JP)

(72) Inventors: Nannan Wang, Plano, TX (US); Xi Wang, Murphy, TX (US); Paparao Palacharla, Richardson, TX (US); Tadashi Ikeuchi, Plano, TX (US); Weisheng Xie, Plano, TX (US)

(73) Assignee: Fujitsu Limited, Kawasaki (JP)

(*) Notice: Subject to any disclaimer, the term of this patent is extended or adjusted under 35 U.S.C. 154(b) by 143 days.

(21) Appl. No.: 16/154,549

(22) Filed: Oct. 8, 2018

(65) Prior Publication Data

US 2020/0112502 A1    Apr. 9, 2020

(51) Int. Cl.
*H04L 12/26* (2006.01)
*H04L 12/733* (2013.01)
*H04L 12/721* (2013.01)
*G06F 16/901* (2019.01)

(52) U.S. Cl.
CPC ........ *H04L 45/126* (2013.01); *G06F 16/9024* (2019.01); *H04L 43/026* (2013.01); *H04L 45/124* (2013.01); *H04L 45/38* (2013.01)

(58) Field of Classification Search
CPC ...... H04L 45/124; H04L 45/38; H04L 43/026
See application file for complete search history.

(56) References Cited

U.S. PATENT DOCUMENTS

| | | | |
|---|---|---|---|
| 2017/0104609 A1* | 4/2017 | McNamee | H04M 15/61 |
| 2018/0183855 A1* | 6/2018 | Sabella | G06F 9/505 |
| 2019/0044818 A1* | 2/2019 | Nolan | H04L 41/12 |
| 2019/0253477 A1* | 8/2019 | Nolan | H04L 67/12 |

OTHER PUBLICATIONS

Fujitsu Press Release: Fujitsu and VMware Expand their Strategic Collaboration to Offer IoT Solutions for the Automobile Industry, retrieved from url: http://www.fujitsu.com/global/about/resources/news/press-releases/2017/0330-01.html, Mar. 30, 2017; 3 pages.

\* cited by examiner

*Primary Examiner* — Fahmida S Chowdhury
(74) *Attorney, Agent, or Firm* — Baker Botts L.L.P.

(57) ABSTRACT

Systems and methods for identifying a service region that includes sub-regions; calculating, for each pair of neighboring sub-regions, traffic data of computing devices traveling between the pair of sub-region; generating a directed graph representing the service region, the directed graph including nodes representing the sub-regions and the links between the nodes representing the first and the second traffic data; partitioning the directed graph into graph partitions, each graph partition including sub-graphs; calculating, for each sub-graph of each graph partition, a net traffic flow for the sub-graph based on a difference of the first and the second traffic data of the sub-regions that correspond to the nodes of the sub-graph; calculating, for each graph partition, a net traffic flow for the graph partition based on a summation of the net traffic flow of each sub-graph of the graph partition; identifying a particular graph partition having a smallest net traffic flow.

14 Claims, 17 Drawing Sheets

US 10,841,202 B2

DISTRIBUTION OF COMPUTING RESOURCES OF A RADIO ACCESS NETWORK

BACKGROUND

Field of the Disclosure

The present disclosure relates generally to distribution of computing resources of a radio access network.

Description of the Related Art

In cellular radio systems, wireless terminals communicate via a radio access network, RAN, with one or more core networks. The wireless terminals can be mobile stations or other types of user equipment, such as portable, pocket, hand-held, computer-included, or car-mounted mobile devices which communicate voice and/or data with the radio access network, e.g., mobile telephones and laptops with wireless capability. The RAN covers a geographical area which is divided into service areas that is a geographical area where radio coverage is provided by the RAN.

SUMMARY

Innovative aspects of the subject matter described in this specification may be embodied in methods that include the actions of identifying, by an inter-group minimal flow (IMF) engine, a service region that includes a plurality of sub-regions, each sub-region served by a corresponding distributed unit of a radio access network (RAN), wherein each central unit of a plurality of central units of the RAN can support a particular number of distributed units; calculating, for each pair of neighboring sub-regions, i) first traffic data of computing devices traveling from a first sub-region of the neighboring sub-regions to a second sub-region of the neighboring sub-regions, and ii) second traffic data of computing devices traveling from the second-sub region of the neighboring sub-regions to the first sub-region of the neighboring sub-regions; generating, by the IMF engine, a directed graph representing the service region, the directed graph including a plurality of nodes representing the sub-regions and the links between the nodes representing the first and the second traffic data; partitioning the directed graph into a plurality of graph partitions, each graph partition including a plurality of sub-graphs, each graph partition including a totality of the nodes, wherein for each graph partition, each sub-graph of the graph partition includes one or more nodes that represent neighboring geographic sub-regions; calculating, for each sub-graph of each graph partition, a net traffic flow for the sub-graph based on a difference of the first and the second traffic data of the sub-regions that correspond to the nodes of the sub-graph; calculating, for each graph partition, a net traffic flow for the graph partition based on a summation of the net traffic flow of each sub-graph of the graph partition; identifying a particular graph partition having a smallest net traffic flow from among the net traffic flows of each of the graph partitions; and assigning, by the IMF engine, each central unit of the plurality of central units of the RAN to a respective sub-region that corresponds to the sub-graphs of the particular graph partition.

Other embodiments of these aspects include corresponding systems, apparatus, and computer programs, configured to perform the actions of the methods, encoded on computer storage devices.

These and other embodiments may each optionally include one or more of the following features. For instance, the number of nodes of each sub-graph is based on the particular number of distributed units that each central unit can support. The computing units are associated with automobiles. Receiving, from a computing device within a particular geographic sub-region, a computational task; identifying, based on the particular graph partition, a corresponding central unit associated with the sub-graph that includes the particular geographic region; and facilitating performance of the computational task by the corresponding central unit. The corresponding central unit includes multi-access edge computing (MEC) to facilitate performance of the computational task. The first traffic data includes an average transition rate of the computing devices traveling from the first sub-region to the second sub-region over a period of time; and the second traffic data includes an average transition rate of the computing devices traveling from the second sub-region to the first sub-region over the same period of time. For each graph partition, each sub-graph of the graph partition is distinct, and non-overlapping from each remaining sub-graph of the graph partition.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

This document describes methods, systems, and computer readable medium for the distribution of the computing resources of a radio access network. Specifically, this document discusses minimizing peak computing resources of the radio access network based on traffic patterns of connected automobiles.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
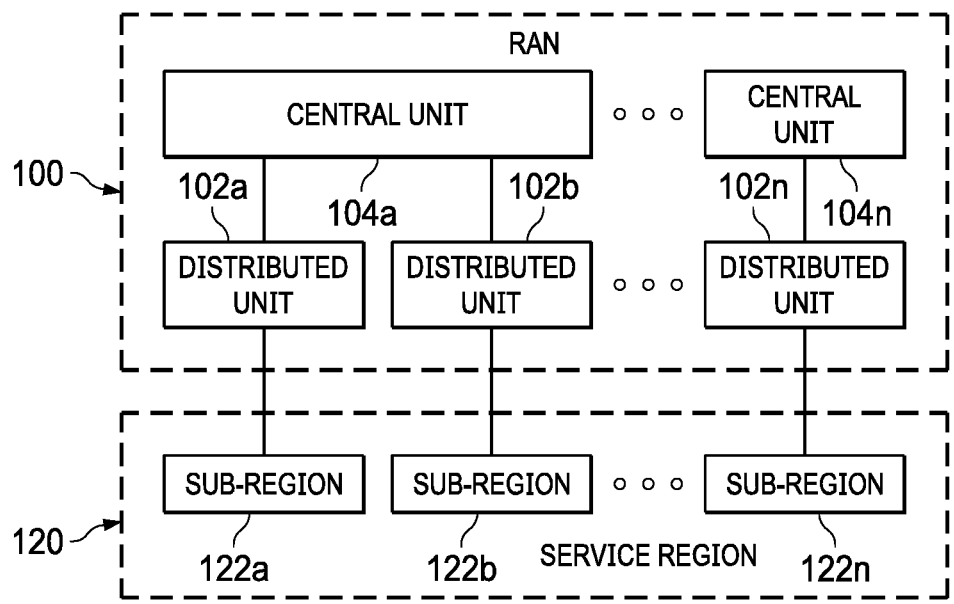
FIG. 1 is a block diagram of selected elements of an embodiment of a radio access network (RAN)

FIG. 1 illustrates a portion of a radio access network (RAN) 100. The RAN 100 can include a plurality of distributed units 102*a*, 102*b*, . . . , 102*n* (collectively referred to as distributed units 102); and further includes a plurality of central units 104a, . . . , 104n (collectively referred to as central units 104). The RAN 100 can further include additional computing components, such as a remote radio head (RRU) coupled to the distributed units 102, and a 5G core (5GC) coupled to the central units 104. The RRU and the 5GC are not shown for simplicity of illustration.

Each central unit 104 can support a particular number of distributed units 102. For example, a central unit 104 can support a number of distributed units 102 based on the processing capabilities of the central unit 104 and/or the distributed units 102, network traffic of the RAN 100, among other parameters. In the illustrated example, the central unit 104a supports (or is communicatively coupled with) the distributed units 102a and 102b; and the central unit 10n supports (or is communicatively coupled with) the distributed unit 104n. In some examples, the central unit 104 can support any number of distributed units 102.

The RAN 100 can serve a service region 120. The service region 120 can be a geographically defined area (e.g., a city, or a portion of a city such as a city center). Serving the service region 120 by the RAN 100 can include providing telecommunication processing to the service region 120 (or within the service region 120); and/or providing computational resources to the service region 120. For example, the RAN 100 can include a telecommunication network (e.g., 3G, 4G, LTE, 5G) that provides telecommunication services to computing devices located within the service region 120, such as mobile computing devices and/or connected automobiles (autonomous or semi-autonomous) that include processing and telecommunication resources.

The service region 120 can include a plurality of sub-regions 122a, 122b, . . . 122n (collectively referred to as sub-regions 122). Each of the sub-regions 122 can correspond to one of the distributed units 102. Specifically, the sub-region 122a corresponds to the distributed unit 102a, the sub-region 122b corresponds to the distributed unit 102b, and the sub-region 122n corresponds to the distributed unit 102n. However, in some examples, a sub-region 122 can correspond to more than one distributed unit 102; and/or a distributed unit 102 can correspond to more than one sub-region 122.

Figure 2:
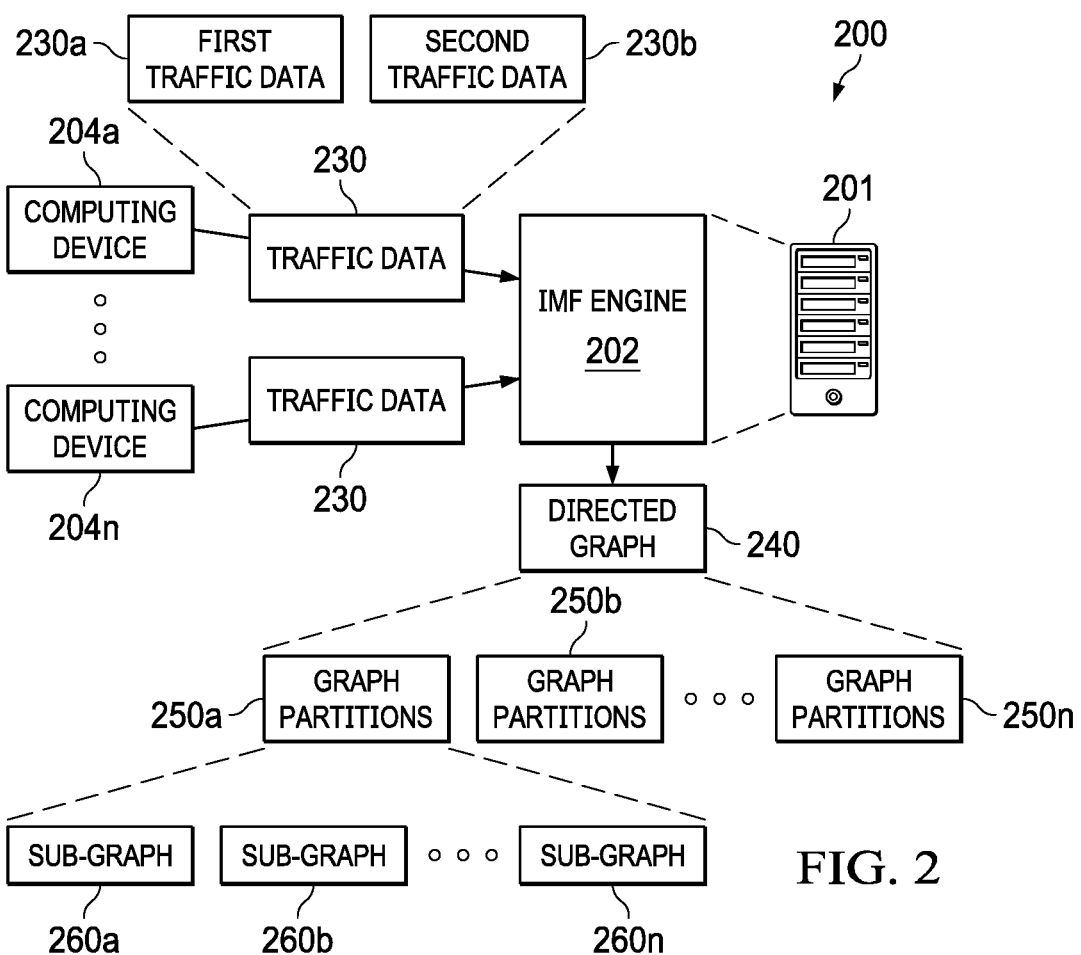
FIG. 2 is a block diagram of selected elements of an embodiment of a computing environment for distribution of the computing resources of the RAN.

FIG. 2 illustrates a computing environment 200 for distribution of the computing resources of the RAN 100. Specifically, the environment 200 can include a server computing system 201 that includes an inter-group minimal flow (IMF) engine 202. The environment 200 can further include computing devices 204a, . . . , 204n (collectively referred to as computing devices 204). To that end, the IMF engine 202 can ultimately facilitate allocating resources of the RAN 100 to the computing devices 204, described further herein. The IMF engine 202 can be one or more modules of the server computing system 201.

In some implementations, the IMF engine 202 can calculate traffic data of the computing devices 204 traveling between the sub-regions 122. The traffic data can include the physical movement of computing devices 204 traveling between the sub-regions 122; that is, the physical movement of the computing device 204 from a sub-region 122 to another sub-region 122. For example, the IMF engine 202 can receive respective traffic data 230 from the computing devices 204. The IMF engine 202 can calculate, for each pair of neighboring sub-regions 122, traffic data 230 of computing devices 204 traveling between the neighboring sub-regions 122. Specifically, the IMF engine 202 can calculate, for each pair of neighboring sub-regions 122, i) first traffic data 230a of computing devices 204 traveling from a first sub-region of the neighboring sub-regions 122 to a second sub-region of the neighboring sub-regions 122 and ii) second traffic data 230b of computing devices 204 traveling from the second sub-region of the neighboring sub-regions 122 to the first sub-region of the neighboring sub-regions 122. In some examples, the neighboring sub-regions 122 can be geographically neighboring sub-regions 122.

In some examples, the first traffic data 230a can include an average transition rate of the computing devices 204 traveling from the first sub-region of the neighboring sub-regions 122 to the second sub-region of the neighboring sub-regions 122 over a period time; and the second traffic data 230b can include an average transition rate of the computing devices 204 traveling from the second sub-region of the neighboring regions 122 to the first sub-region of the neighboring sub-regions 122 over the same period of time. In some examples, the first traffic data 230a can include an average transition rate of the computing devices 204 traveling from the first sub-region of the neighboring sub-regions 122 to the second sub-region of the neighboring sub-regions 122 over a period time; and the second traffic data 230b can include an average transition rate of the computing devices 204 traveling from the second region of the neighboring regions 122 to the first sub-region of the neighboring sub-regions 122 over a different period of time.

In some examples, the computing devices 204 that are traveling between the neighboring sub-regions 122 can include computing devices 204 associated with automobiles (e.g., connected automobiles, or smart automobiles). That is, the automobiles (autonomous, or semi-autonomous) can include processing resources such as telecommunication systems that can be in communication with the RAN 100.

Figure 3:
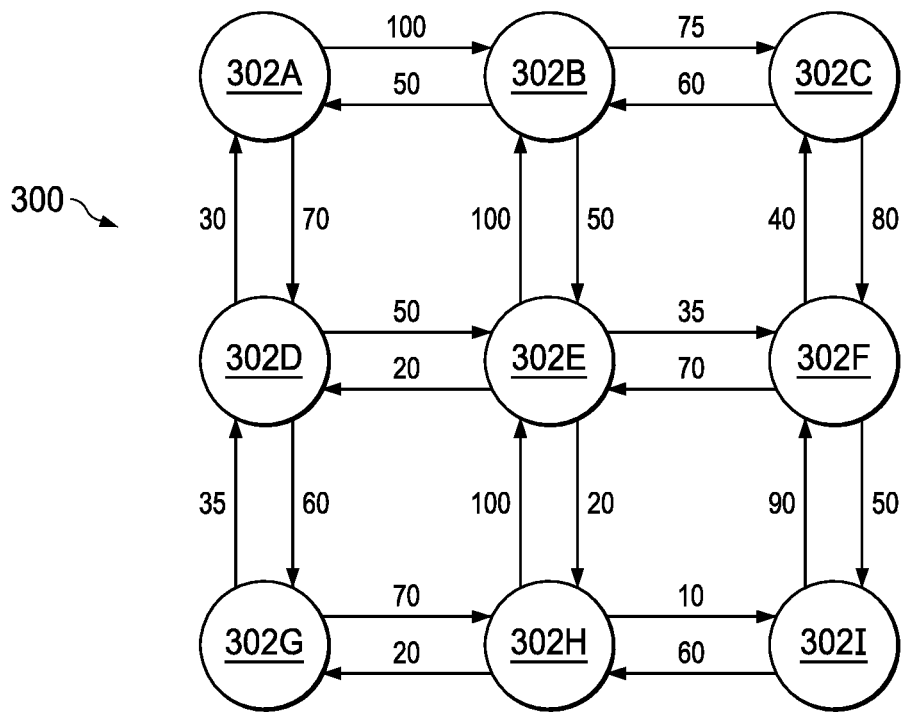
FIG. 3 illustrates an example directed graph used in the distribution of the computing resources of the RAN.
Figure 4A:
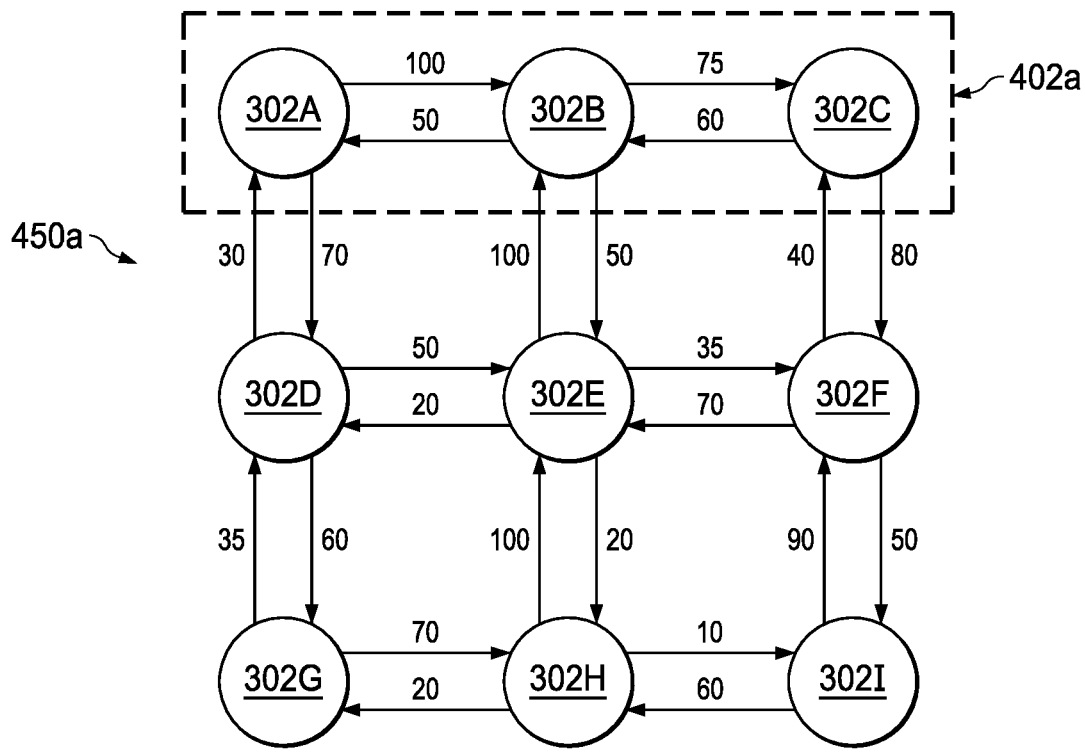
FIGS. 4A-4E, 5A-5J, 6A-6I are graph partitions of the directed graph of FIG. 3.
Figure 4B:
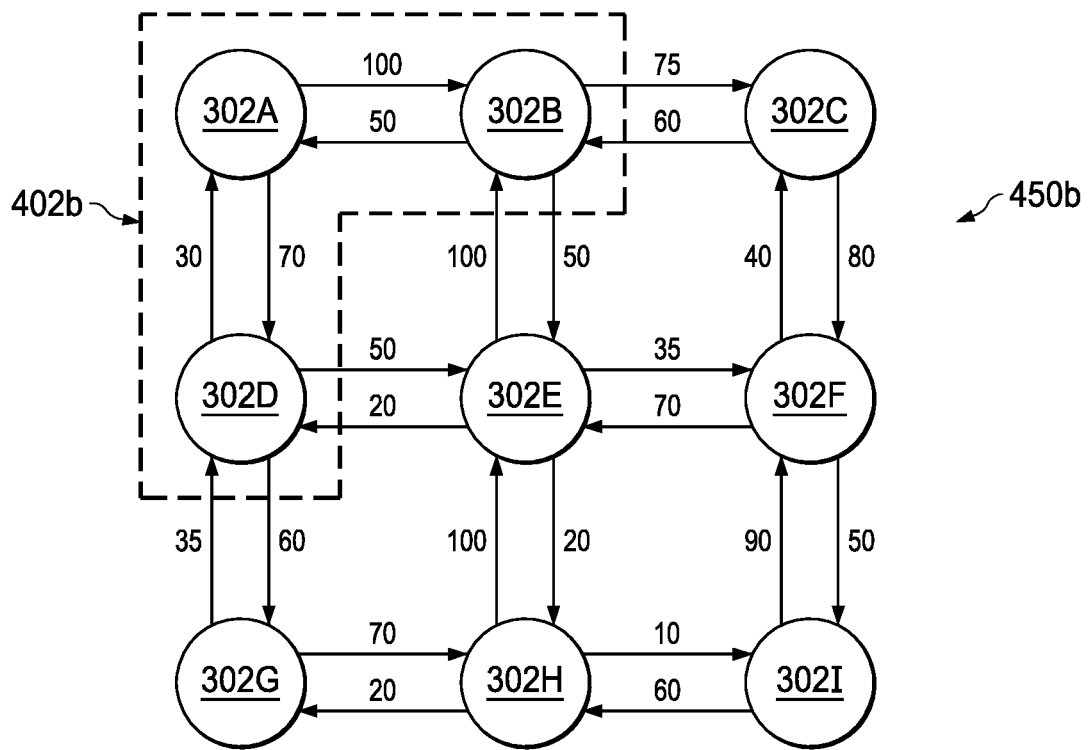
Figure 4C:
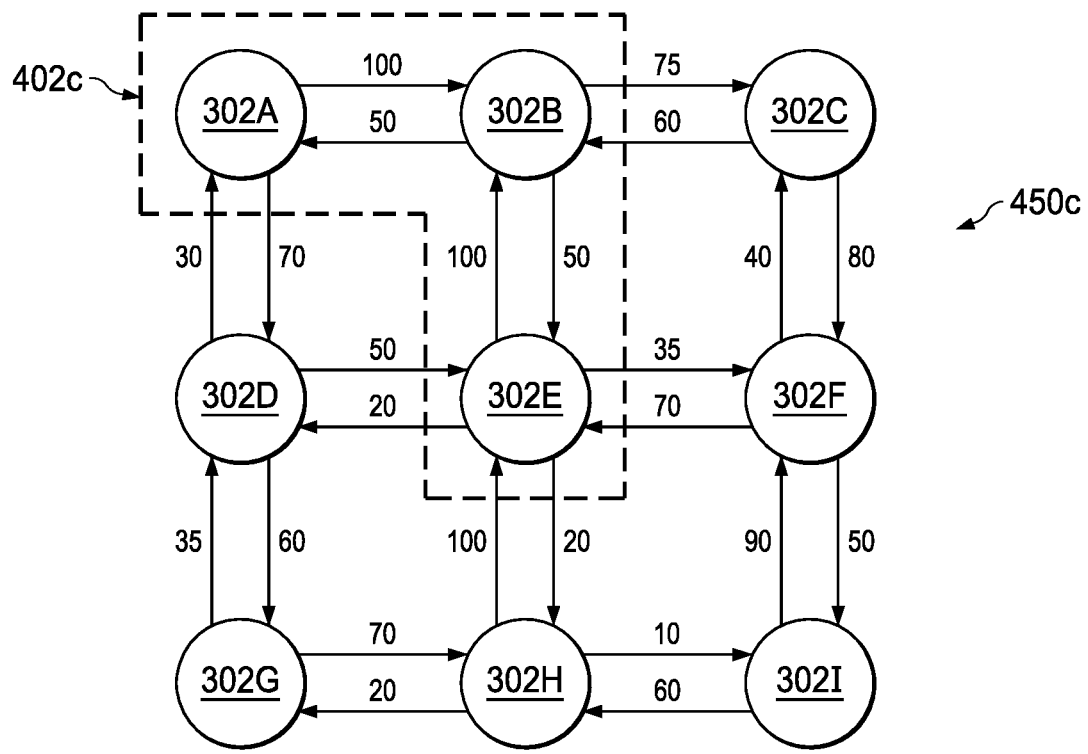
Figure 4D:
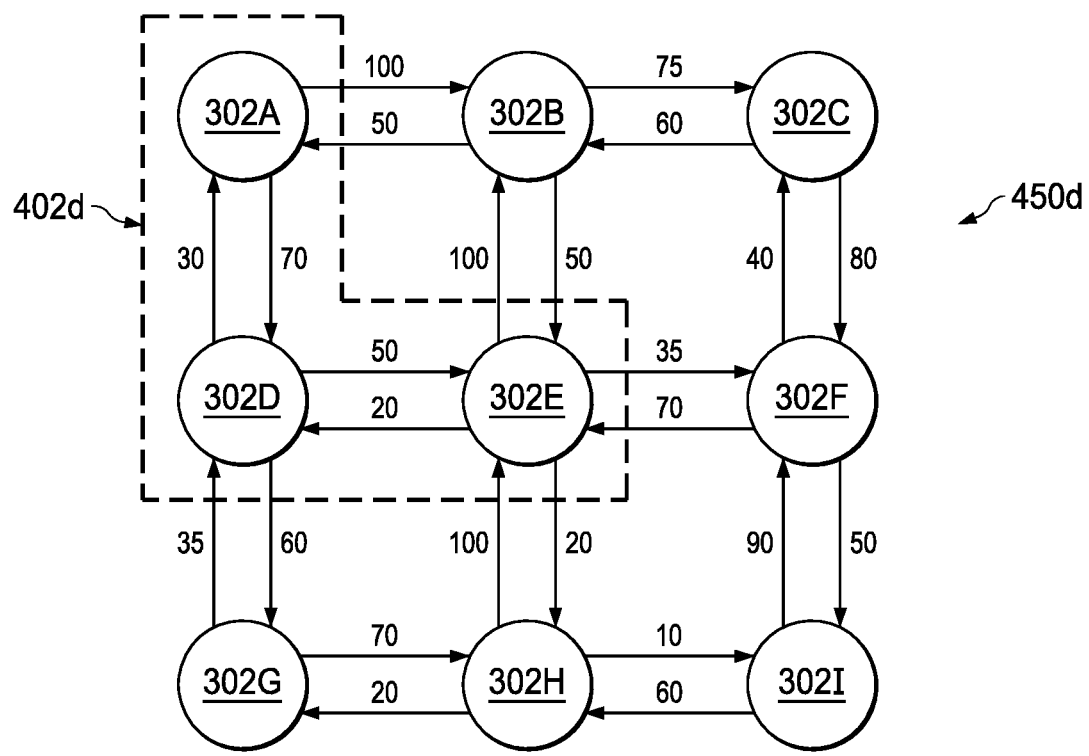
Figure 4E:
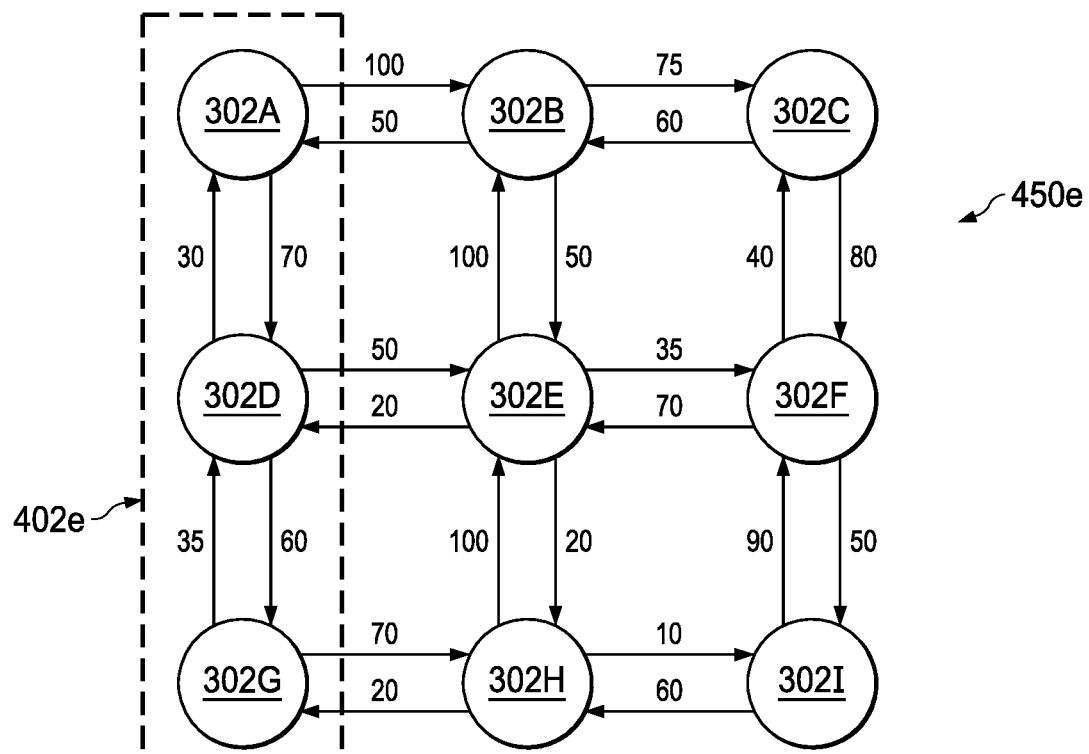
Figure 4F:
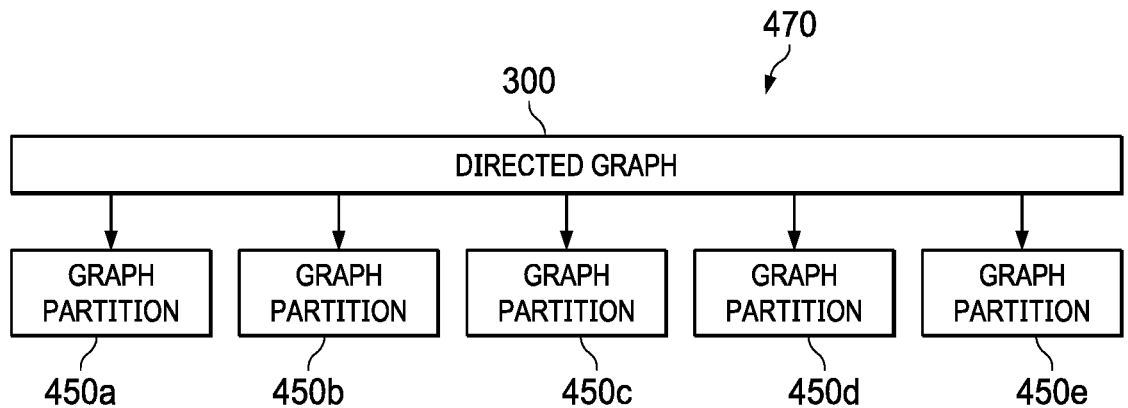
FIGS. 4F, 5K illustrate the relationship between the directed graph of FIG. 3 and the graph partitions.
Figure 8:
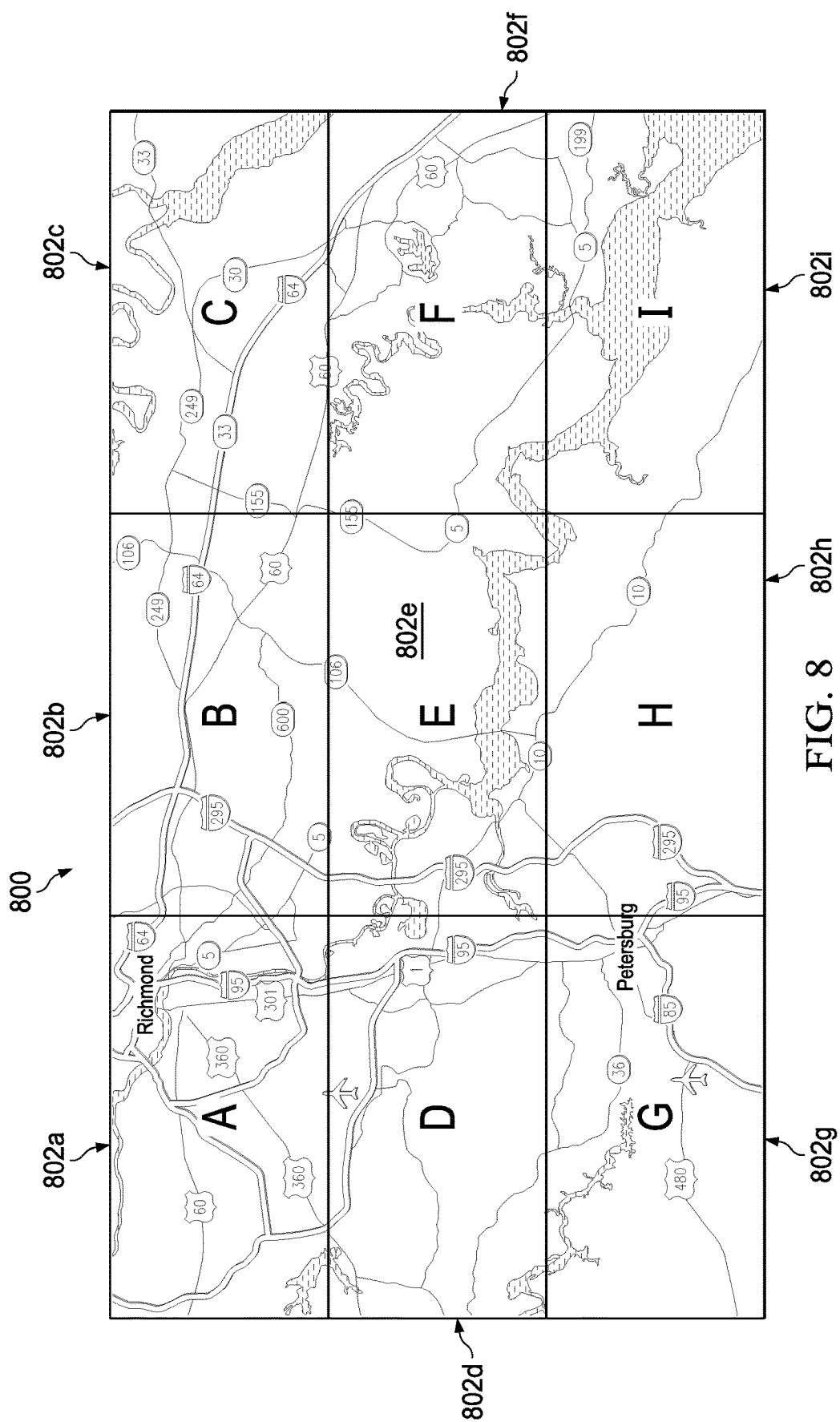
FIG. 8 illustrates a service region corresponding to the directed graph of FIG. 3.

The IMF engine 202 can generate a directed graph 240 that represents the service region 120. The directed graph 240 includes a plurality of nodes representing the sub-regions 122 and the links between the nodes representing the traffic data 230, as explained further with reference to the example of FIG. 3. FIG. 3 illustrates an example directed graph 300, similar to the directed graph 240 of FIG. 2. The directed graph 300 includes nodes 302a, 302b, 302c, 302d, 302e, 302f, 302g, 302h, 302i (collectively referred to as nodes 302). The nodes 302 can represent respective sub-regions 122. In an illustrated example, the directed graph 300 of FIG. 3 can be a representation of a service region shown in FIG. 8. Specifically, FIG. 8 illustrates a service region 800, similar to the service region 120 of FIG. 1, that includes sub-regions 802a, 802b, 802c, 802d, 802e, 802f, 802g, 802h, 802i (collectively referred to as sub-regions 802). The sub-regions 802 can be similar to the sub-regions 122 of FIG. 1. The nodes 302 can represent the sub-regions 802—the node 302a can represent the sub-region 802a, the node 302b can represent the sub-region 802b, the node 302c can represent the sub-region 802c, the node 302d can represent the sub-region 802d, the node 302e can represent the sub-region 802e, the node 302f can represent the sub-region 802f, the node 302g can represent the sub-region 802g, the node 302h can represent the sub-region 802h, and the node 302i can represent the sub-region 802i. Note that the service region 800 is not limited to the size of the sub-regions 802—the sub-regions 802 can be defined as desired.

The nodes 302 can be associated with computing devices, e.g., the computing devices 204, traveling between the sub-regions 122—e.g., from one sub-region 122 to another sub-region 122, and in the context of FIG. 8, from one sub-region 802 to another sub-region 802. The directed graph 300 further includes links between the nodes 302 that represent the first traffic data 230a and the second traffic data 230b.

As mentioned above, the IMF engine 202 can calculate, for each pair of neighboring sub-regions 122, i) first traffic data 230a of computing devices 204 traveling from a first sub-region of the neighboring sub-regions 122 to a second sub-region of the neighboring sub-regions 122 and ii) second traffic data 230b of computing devices 204 traveling from the second sub-region of the neighboring sub-regions 122 to the first sub-region of the neighboring sub-regions 122. In the context of the direct graph 300 of FIG. 3 where the nodes 302 represent respective sub-regions 122, traffic between the sub-regions 122 can be referenced as traffic between the nodes 302. For example, the links between neighboring nodes 302a and 302b can indicate first traffic data 230a of 100 and second traffic data 230b of 50 of the respective neighboring sub-regions 122; and the links between neighboring nodes 302a and 302d can include first traffic data 230a of 70 and second traffic data 230b of 30 of the respective neighboring sub-regions 122. Specifically, the first traffic data 230a of 100 indicates 100 computing devices 204 physically moving from the sub-region 122 corresponding to the node 302a to the sub-region 122 corresponding to the node 302b; the second traffic data 230b of 50 indicates 50 computing devices 204 physically moving from the sub-region 122 correspond to the node 302b to the sub-region 122 corresponding to the node 302a; the first traffic data 230a of 70 indicates 70 computing devices 204 physically moving from the sub-region 122 corresponding to the node 302a to the sub-region 122 corresponding to the node 302d; and the second traffic data 230b of 30 indicates 30 computing devices 204 physically moving from the sub-region 122 corresponding to the node 302d to the sub-region 122 corresponding to the node 302a. To that end, each of the nodes 302 can have links to one or more other neighboring nodes 302, representing traffic data 230 between neighboring sub-regions 122. For example, the node 302e can have links to nodes 302b, 302d, 302f, 302h, representing the respective neighboring sub-regions 122 and the traffic data 230 between the neighboring sub-regions 122.

In some implementations, referring back to FIG. 2, the IMF engine 202 can partition the directed graph 240 into graph partitions 250a, 250b, . . . , 250n (collectively referred to as graph partitions 250). Each of the graph partitions 250 can include one or more sub-graphs 260a, 260b, . . . 260n (collectively referred to as sub-graphs 260). In some examples, the IMF engine 202 can implement a breadth first search (BFS) algorithm to partition the directed graph 240 into the graph partitions 250, and the sub-graphs 260 of each graph partition 250.

FIGS. 4-6 illustrate a method of partitioning the directed graph 300 of FIG. 3 into graph partitions 250. Specifically, referring to FIGS. 4A-4F, the IMF engine 202 selects a node 302 as a starting node for identification of the sub-graphs 260. The number of nodes 302 that are included in each sub-graph 260 is based on the number of distributed units 102 each central unit 104 can support, as described prior. In the illustrated example, each central unit 104 can support three distributed units 102. To that end, referring to FIG. 4A, the IMF engine 202 partitions the directed graph 300 into graph partitions by identifying sub-graphs using node 302a as the starting node, and finds all sub-graphs that includes node 302a and that includes three total nodes 302, where each of the nodes 302 is neighboring to the node 302a. For example, the IMF engine 202 partitions the directed graph 300 into a first graph partition 450a by identifying a sub-graph 402a that includes the nodes 302a, 302b, 302c; partitions the directed graph 300 into a second graph partition 450b, as shown in FIG. 4B, by identifying a sub-graph 402b that includes the nodes 302a, 302b, 302d; partitions the directed graph 300 into a third graph partition 450c, as shown in FIG. 4C, by identifying a sub-graph 402c that includes the nodes 302a, 302b, 302e; partitions the directed graph 300 into a fourth graph partition 450d, as shown in FIG. 4D, by identifying a sub-graph 402d that includes the nodes 302a, 302d, 302e; and partitions the directed graph 300 into a fifth graph partition 450e, as shown in FIG. 4E, by identifying a sub-graph 402e that includes the nodes 302a, 302d, 302g. FIG. 4F illustrates an overview 470 of the relationship between the directed graph 300 and the graph partitions 450a, 450b, 450c, 450d, and 450e.

Figure 5A:
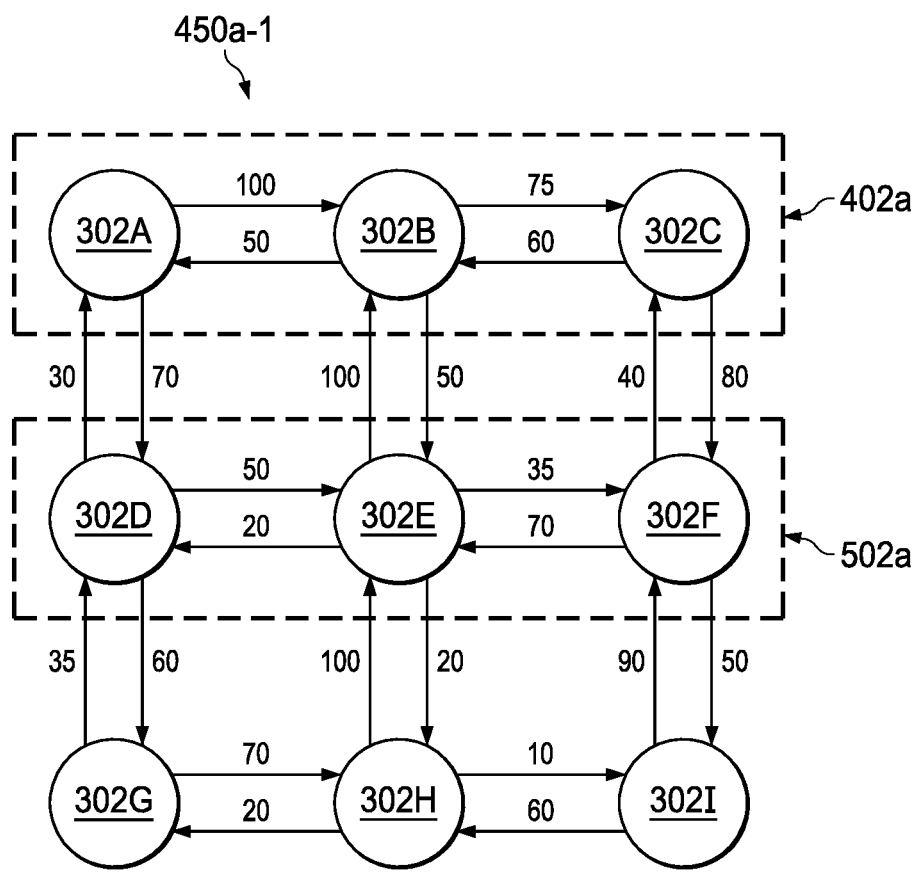
Figure 5B:
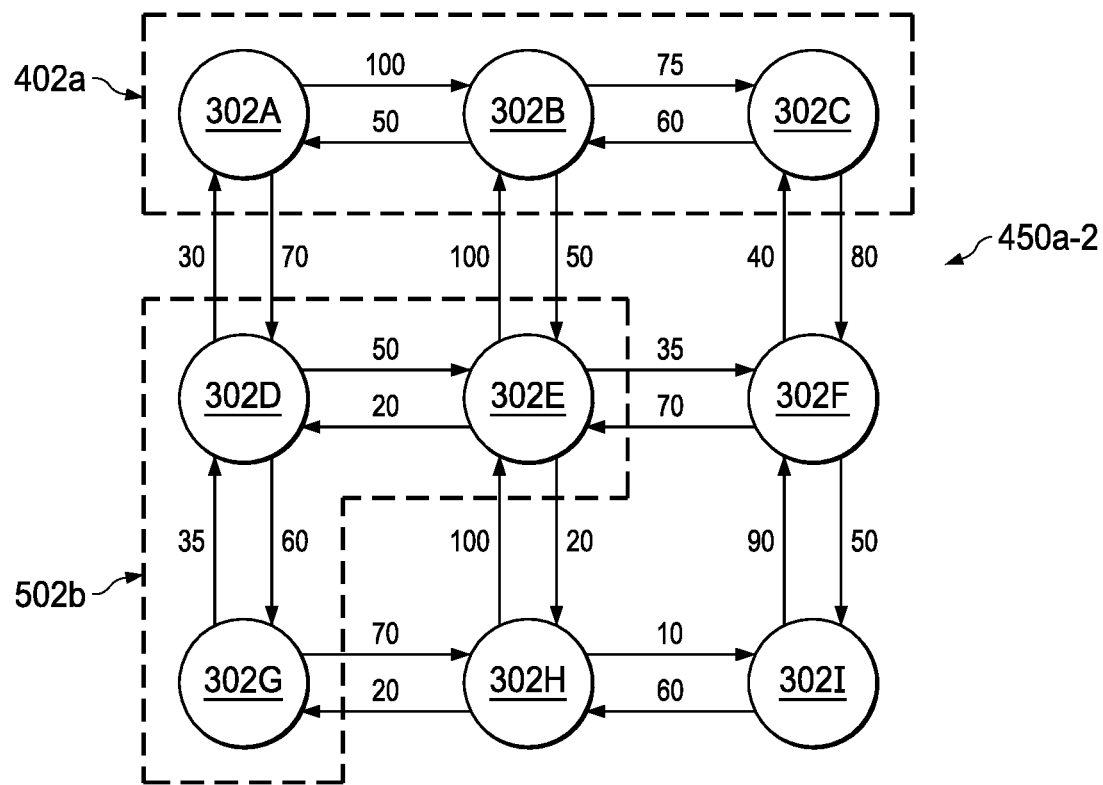
Figure 5C:
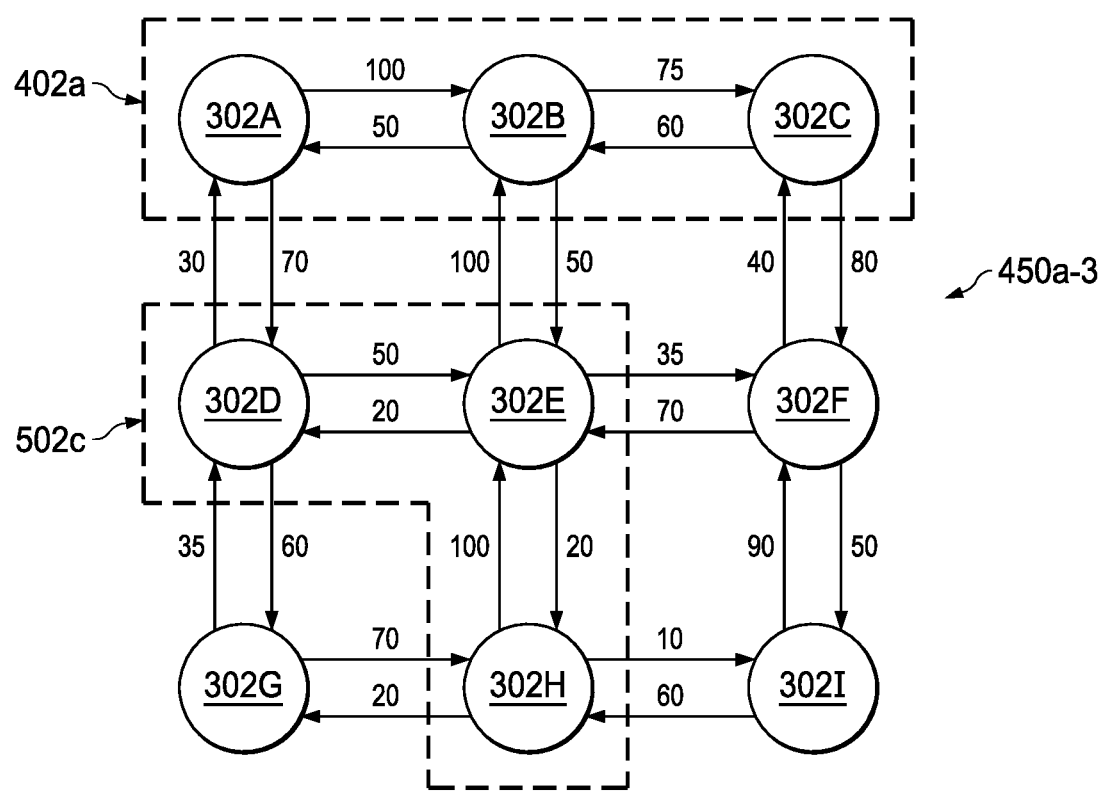

The IMF engine 202 can then identify a subsequent node for identifying further sub-graphs for each of the graph partitions 450a, 450b, 450c, 450d and 450e. For example, referring to FIGS. 5A-5C, the IMF engine 202 identifies the node 302d as the subsequent node for identifying further sub-graphs for the graph partition 450a. As noted above, the sub-graph 402a includes the nodes 302a, 302b, 302c. To that end, the IMF engine 202 identifies sub-graphs using node 302d as the subsequent node, and finds all sub-graphs that includes node 302d and that includes three total nodes 302, where each of the nodes 302 is neighboring to the node 302d, and does not overlap with the sub-graph 402a. Specifically, the IMF engine 202 can partition the graph partition 450a into a graph partition 450a-1, as shown in FIG. 5A, by identifying the sub-graph 502a that includes the nodes 302d, 302e, 302f; partitions the graph partition 450a into a graph partition 450a-2, as shown in FIG. 5B, by identifying the sub-graph 502b that includes the nodes 302d, 302e, 302g; and partitions the graph partition 450a into a graph partition 450a-3, as shown in FIG. 5C, by identifying the sub-graph 502c that includes the nodes 302d, 302e, 302h. In some examples, identification of the subsequent node, by the IMF engine 202, can be arbitrary.

Figure 5D:
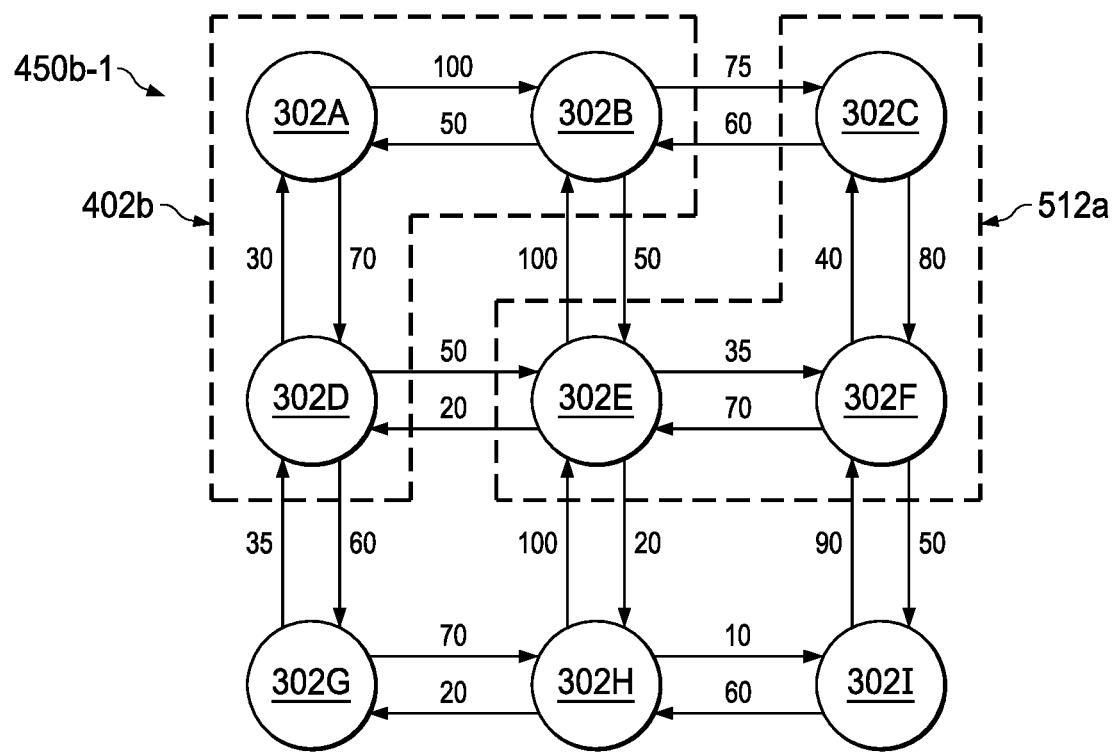
Figure 5E:
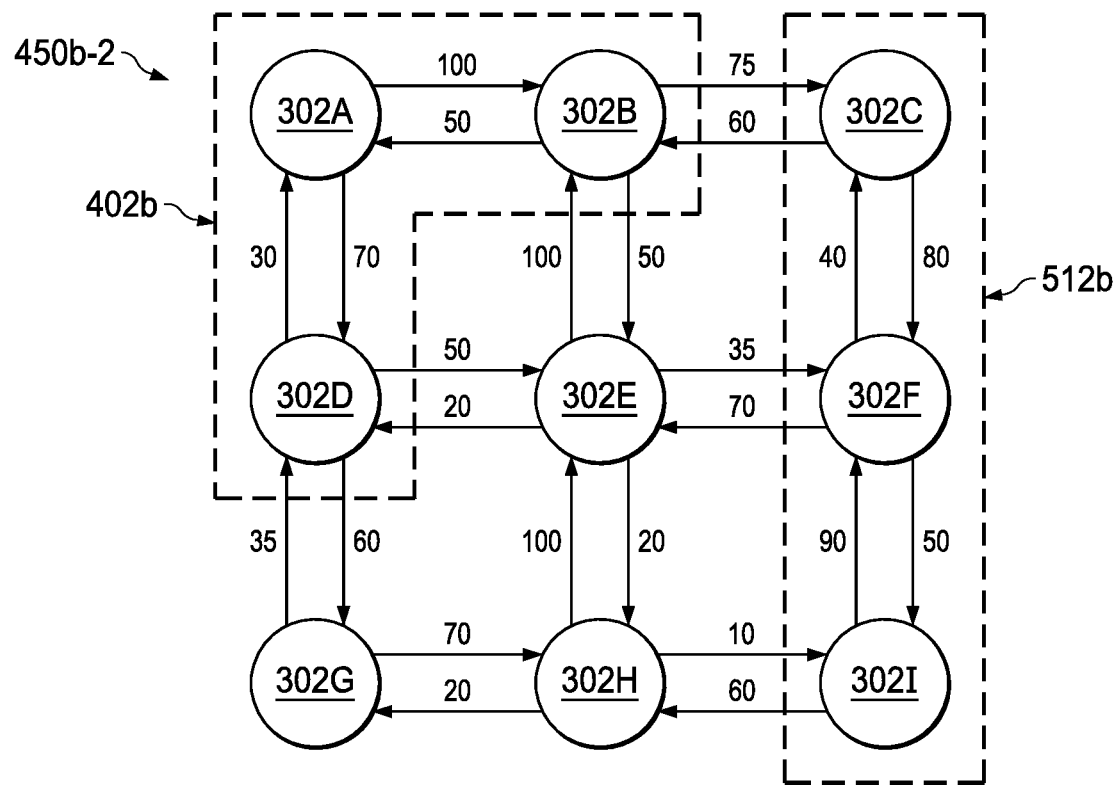

Continuing the example, referring to FIGS. 5D, 5E, the IMF engine 202 identifies the node 302c as the subsequent node for identifying further sub-graphs for the graph partition 450b. As noted above, the sub-graph 402b includes the nodes 302a, 302b, 302d. To that end, the IMF engine 202 identifies sub-graphs using node 302c as the subsequent node, and finds all sub-graphs that include node 302c and that includes three total nodes 302, where each of the nodes 302 is neighboring to the node 302c, and does not overlap with sub-graph 402b. Specifically, the IMF engine 202 can partition the graph partition 450b into a graph partition 450b-1, as shown in FIG. 5D, by identifying the sub-graph 512a that includes the nodes 302c, 302e, 302f; and partition the graph partition 450b into a graph partition 450b-2, as shown in FIG. 5E, by identifying the sub-graph 512b that includes the nodes 302c, 302f, 302i.

Figure 5F:
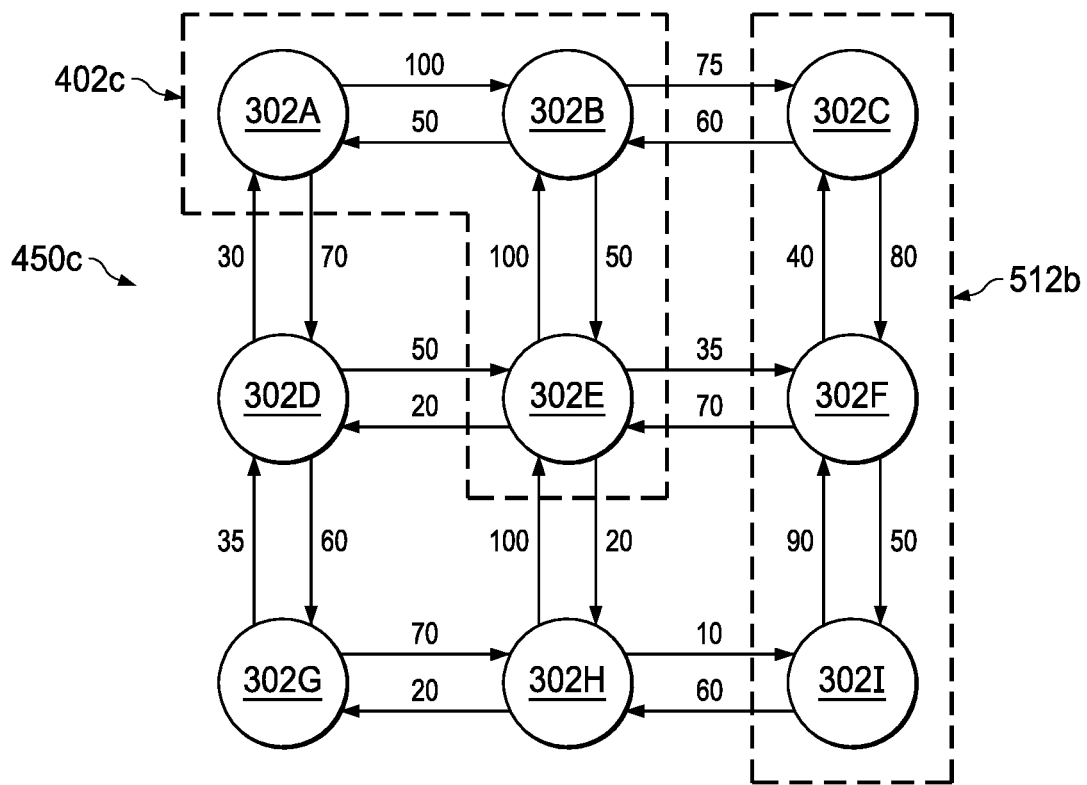

Referring to FIG. 5F, the IMF engine 202 identifies the node 302c as the subsequent node for identifying further sub-graphs for the graph partition 450c. As noted above, the sub-graph 402c includes the nodes 302a, 302b, 302e. To that end, the IMF engine 202 identifies sub-graphs using node 302c as the subsequent node, and finds all sub-graphs that include node 302c and that includes three total nodes 302, where each of the nodes 302 is neighboring to the node 302c, and does not overlap with sub-graph 402c. Specifically, the IMF engine 202 can identify the sub-graph 512b of the graph partition 450c that includes the nodes 302c, 302f, 302i.

Figure 5G:
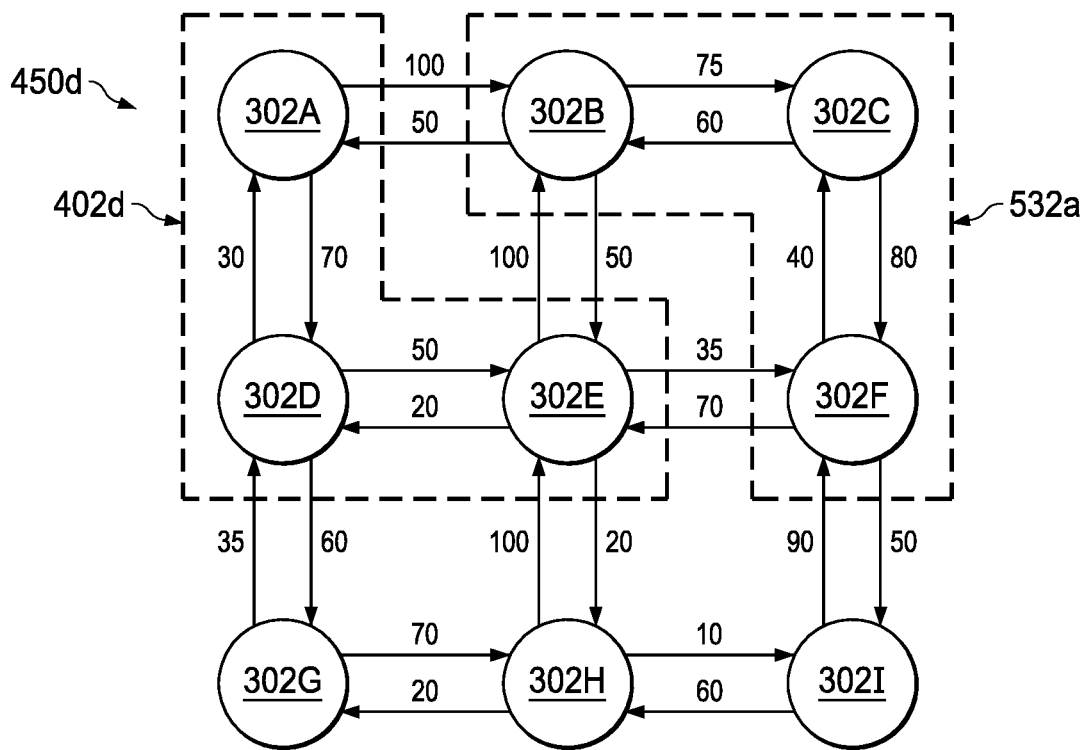

Referring to FIG. 5G, the IMF engine 202 identifies the node 302b as the subsequent node for identifying further sub-graphs for the graph partition 450d. As noted above, the sub-graph 402d includes the nodes 302a, 302d, 302e. To that end, the IMF engine 202 identifies sub-graphs using node 302b as the subsequent node, and finds all sub-graphs that include node 302b and that includes three total nodes 302, where each of the nodes 302 is neighboring to the node 302b, and does not overlap with sub-graph 402d. Specifically, the IMF engine 202 can identify the sub-graph 532a of the graph partition 450d that includes the nodes 302b, 302c, 302f.

Figure 5H:
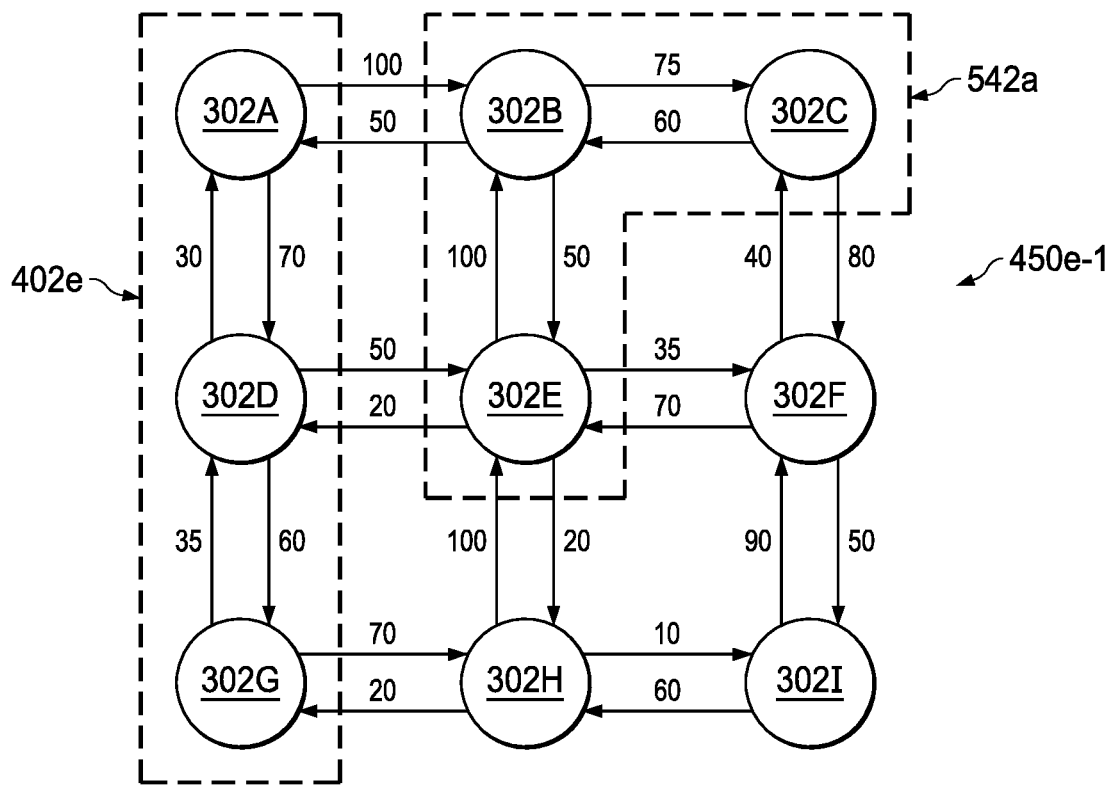
Figure 5I:
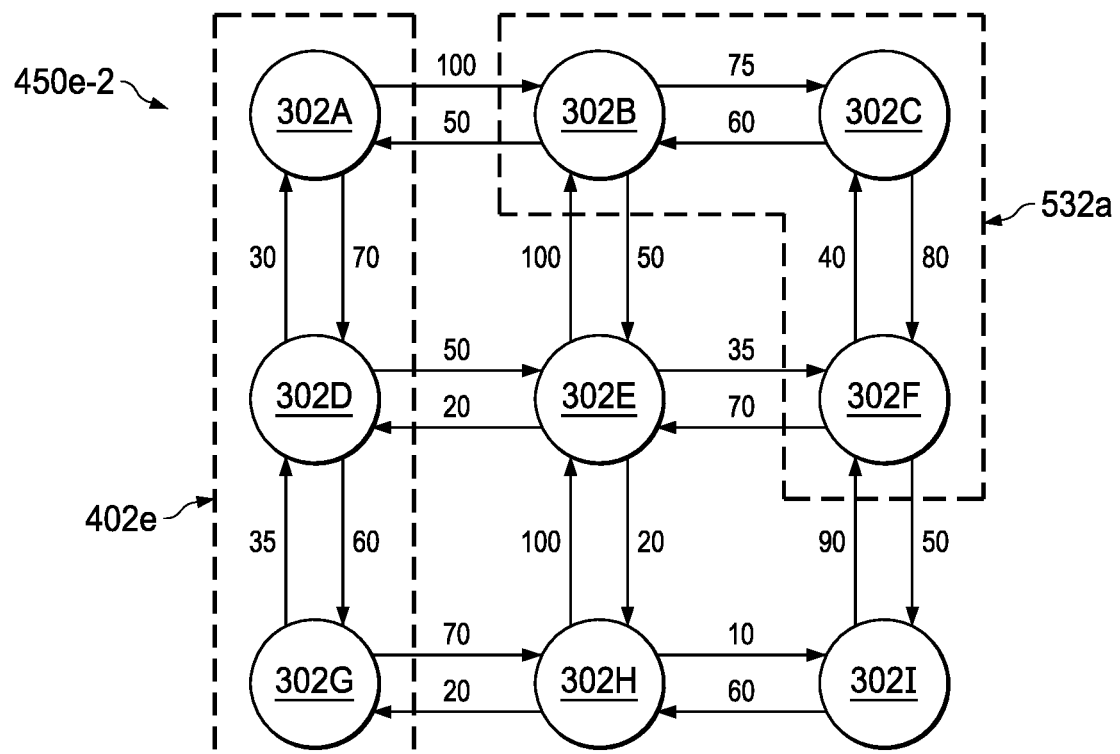
Figure 5J:
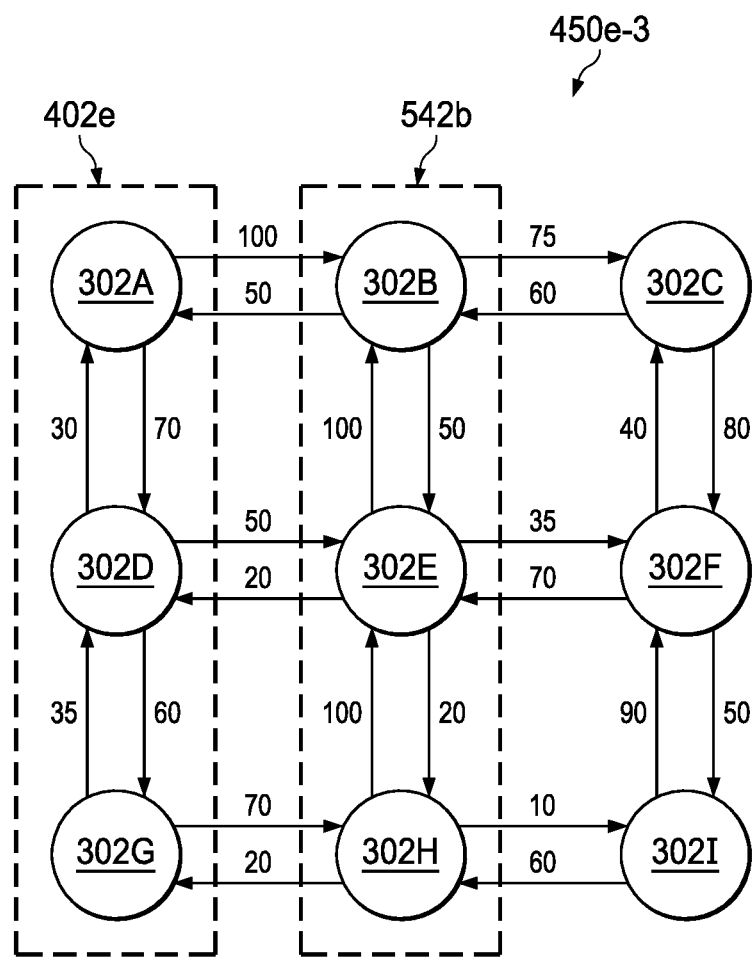

Referring to FIGS. 5H, 5I, and 5J, the IMF engine 202 identifies the node 302b as the subsequent node for identifying further sub-graphs for the graph partition 450e. As noted above, the sub-graph 402e includes the nodes 302a, 302d, 302g. To that end, the IMF engine 202 identifies sub-graphs using node 302b as the subsequent node, and finds all sub-graphs that include node 302b and that includes three total nodes 302, where each of the nodes 302 is neighboring to the node 302b, and does not overlap with sub-graph 402e. Specifically, the IMF engine 202 can partition the graph partition 450e into a graph partition 450e-1, as shown in FIG. 5H, by identifying the sub-graph 542a that includes the nodes 302b, 302c, 302e; partition the graph partition 450e into a graph partition 450e-2, as shown in FIG. 5I, by identifying the sub-graph 532a that includes the nodes 302b, 302c, 302f; and partition the graph partition 450e into a graph partition 450e-3, as shown in FIG. 5J, by identifying the sub-graph 542b that includes the nodes 302b, 302e, 302h.

Figure 5K:
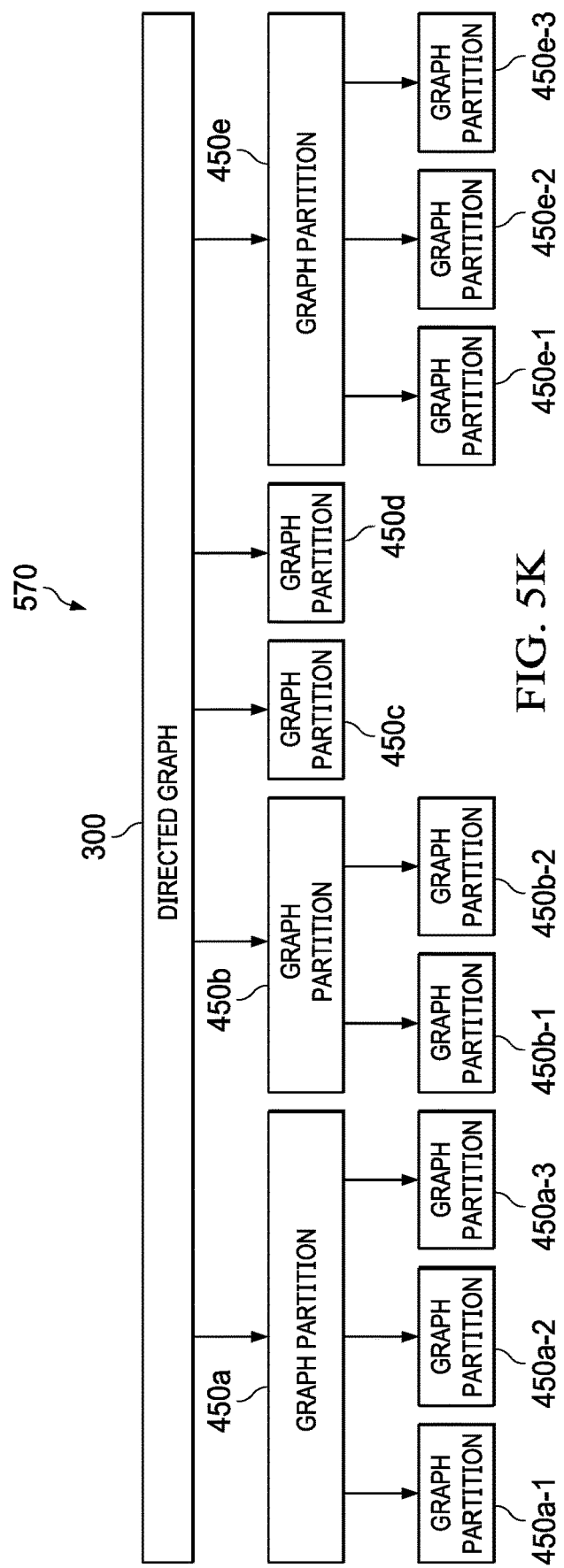

FIG. 5K illustrates an overview 570 of the relationship between the directed graph 300 and the graph partitions 450a-1, 450a-2, 450a-3, 450b-1, 450b-2, 450c, 450d, 450e-1, 450e-2, and 450e-3.

Continuing the example, the IMF engine 202 can then identify a subsequent node for identifying further sub-graphs for each of the graph partitions 450a-1, 450a-2, 450a-3, 450b-1, 450b-2, 450c, 450d, 450e-1, 450e-2, and 450e-3. For example, referring to FIG. 6A, the IMF engine 202 identifies the node 302g as the subsequent node for identifying further sub-graphs for the graph partition 450a-1. As noted above, the sub-graph 402a includes the nodes 302a, 302b, 302c; and the sub-graph 502a includes the nodes 302d, 302e, 302g. To that end, the IMF engine 202 identifies sub-graphs using node 302g as the subsequent node, and finds all sub-graphs that includes node 302g and that includes three total nodes 302, where each of the nodes 302 is neighboring to the node 302g, and does not overlap with the sub-graphs 402a, 502a. Specifically, the IMF engine 202 can identify the sub-graph 602a of the graph partition 450a-1 that includes the nodes 302g, 302h, 302i.

Figure 6A:
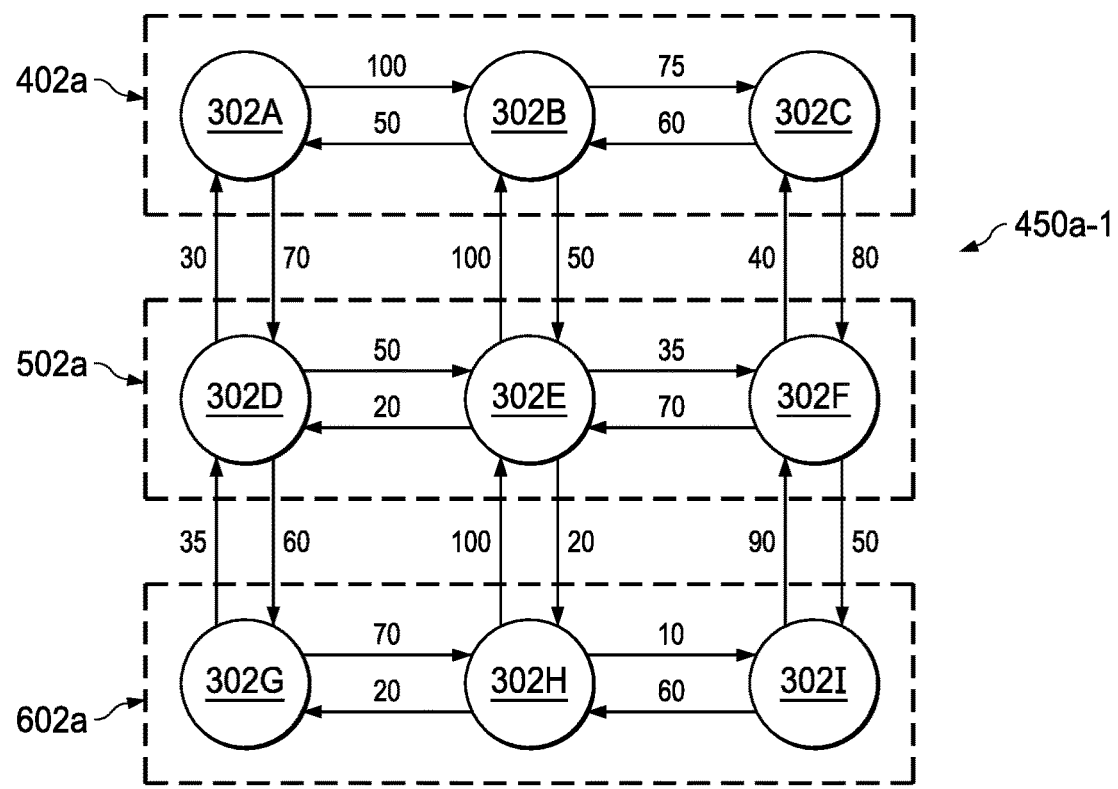
Figure 6B:
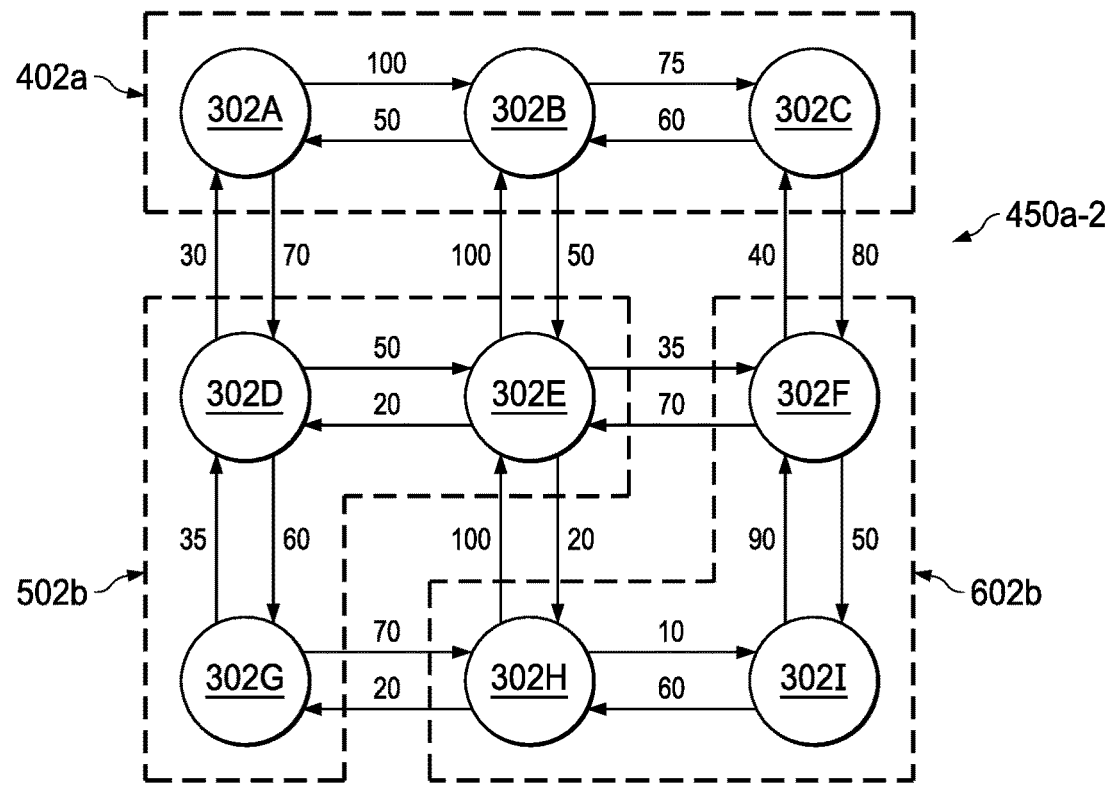

Further, referring to FIG. 6B, the IMF engine 202 identifies the node 302f as the subsequent node for identifying further sub-graphs for the graph partition 450a-2. As noted above, the sub-graph 402a includes the nodes 302a, 302b, 302c; and the sub-graph 502b includes the nodes 302d, 302e, 302g. To that end, the IMF engine 202 identifies sub-graphs using node 302f as the subsequent node, and finds all sub-graphs that includes node 302f and that includes three total nodes 302, where each of the nodes 302 is neighboring to the node 302f, and does not overlap with the sub-graph 402a, 502b. Specifically, the IMF engine 202 can identify the sub-graph 602b of the graph partition 450a-2 that includes the nodes 302f, 302h, 302i. Note that graph partition 450a-3 of FIG. 5C is invalid as a potential sub-graph that includes nodes 302f, 302g, 302i are not neighboring nodes.

Figure 6C:
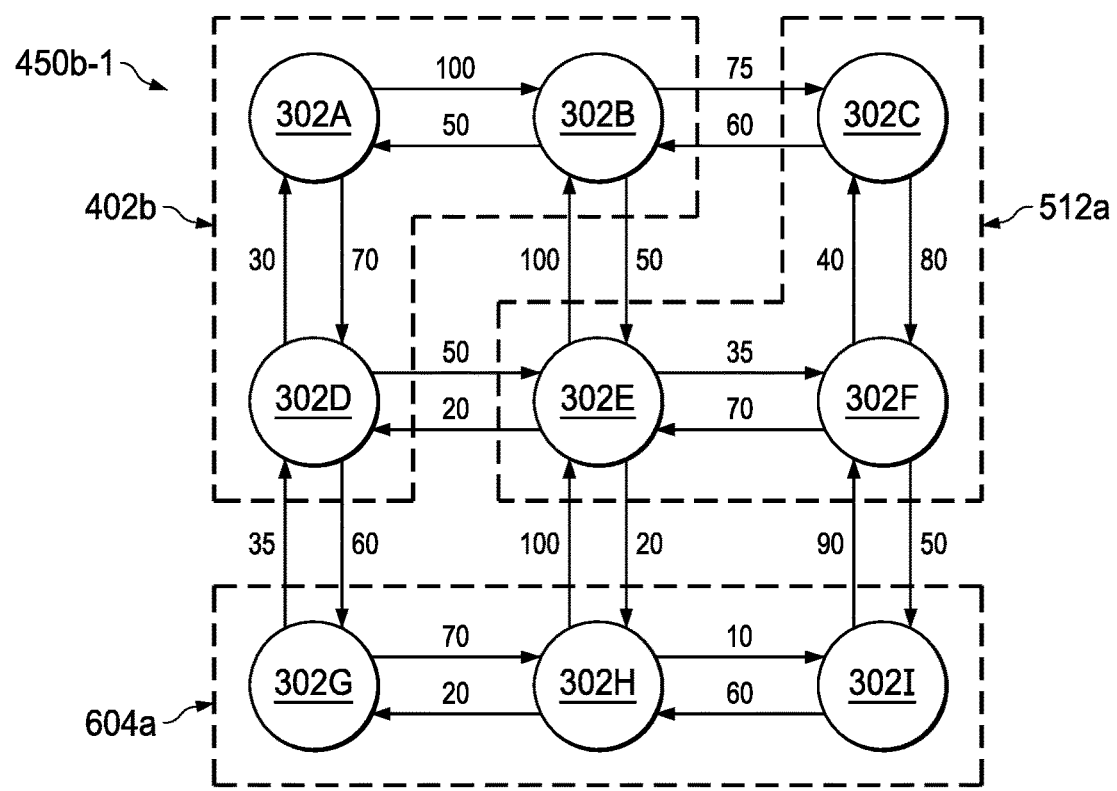

Referring to FIG. 6C, the IMF engine 202 identifies the node 302g as the subsequent node for identifying further sub-graphs for the graph partition 450b-1. As noted above, the sub-graph 402b includes the nodes 302a, 302b, 302d and the sub-graph 512a includes the nodes 302c, 302e, 302f. To that end, the IMF engine 202 identifies sub-graphs using node 302g as the subsequent node, and finds all sub-graphs that includes node 302g and that includes three total nodes 302, where each of the nodes 302 is neighboring to the node 302g, and does not overlap with the sub-graph 402b, 512a. Specifically, the IMF engine 202 can identify the sub-graph 604a of the graph partition 450b-1 that includes the nodes 302g, 302h, 302i.

Figure 6D:
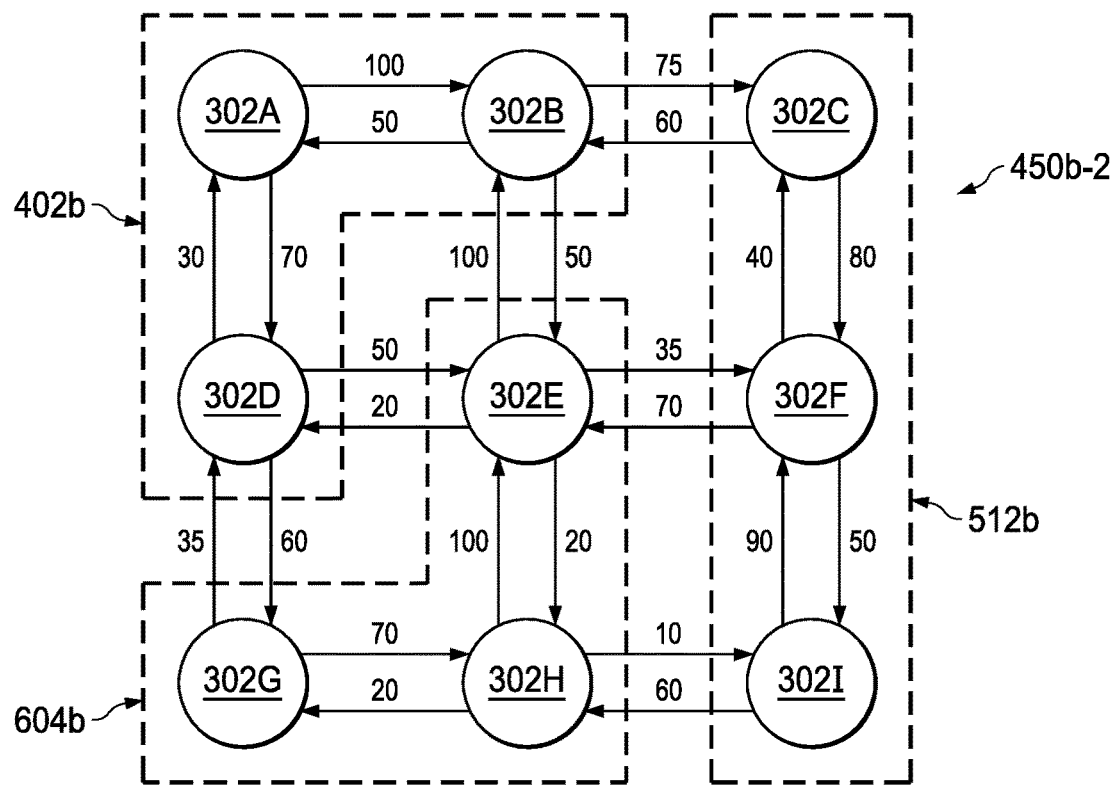

Further, referring to FIG. 6D, the IMF engine 202 identifies the node 302e as the subsequent node for identifying further sub-graphs for the graph partition 450b-2. As noted above, the sub-graph 402b includes the nodes 302a, 302b, 302d; and the sub-graph 512b that includes the nodes 302c, 302f, 302i. To that end, the IMF engine 202 identifies sub-graphs using node 302e as the subsequent node, and finds all sub-graphs that includes node 302e and that includes three total nodes 302, where each of the nodes 302 is neighboring to the node 302e and does not overlap with the sub-graph 402b, 512b. Specifically, the IMF engine 202 can identify the sub-graph 604b of the graph partition 450b-2 that includes the nodes 302e, 302g, 302e.

Figure 6E:
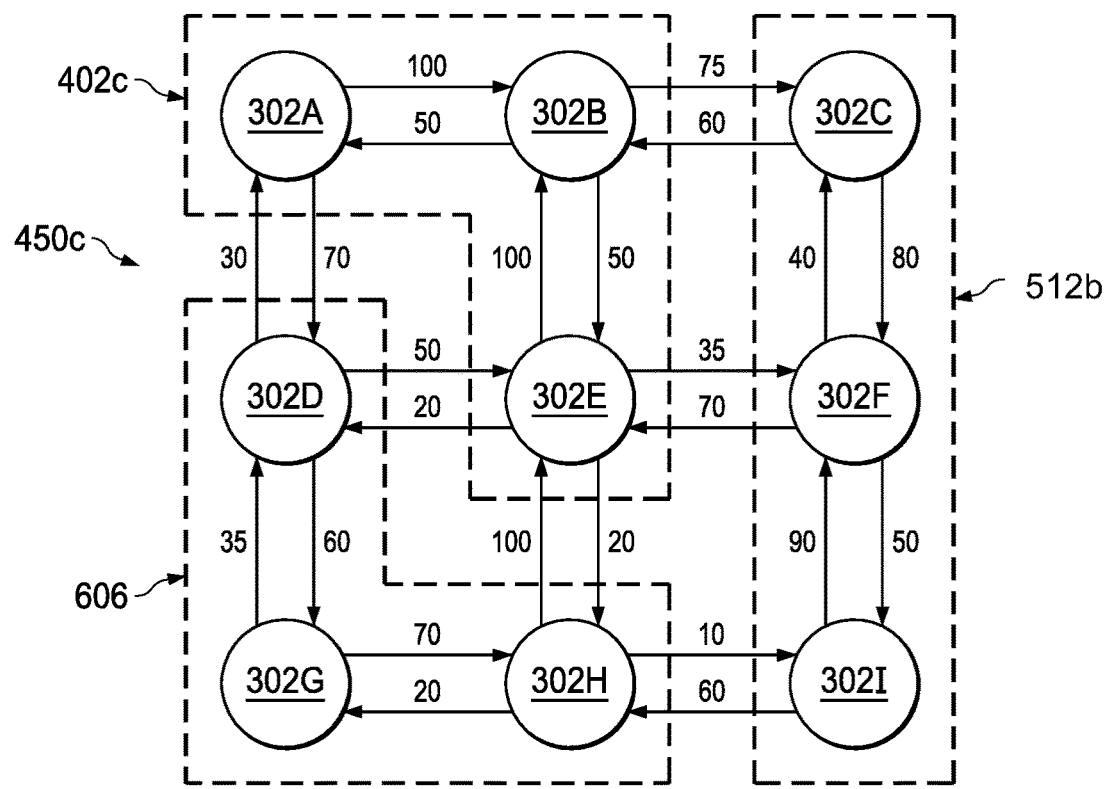

Referring to FIG. 6E, the IMF engine 202 identifies the node 302d as the subsequent node for identifying further sub-graphs for the graph partition 450c. As noted above, the sub-graph 402c includes the nodes 302a, 302b, 302e; and the sub-graph 512b includes the nodes 302c, 302f, 302i. To that end, the IMF engine 202 identifies sub-graphs using node 302d as the subsequent node, and finds all sub-graphs that includes node 302d and that includes three total nodes 302, where each of the nodes 302 is neighboring to the node 302d, and does not overlap with the sub-graph 402c, 512b. Specifically, the IMF engine 202 can then identify the sub-graph 606 of the graph partition 450c that includes the nodes 302d, 302g, 302h.

Figure 6F:
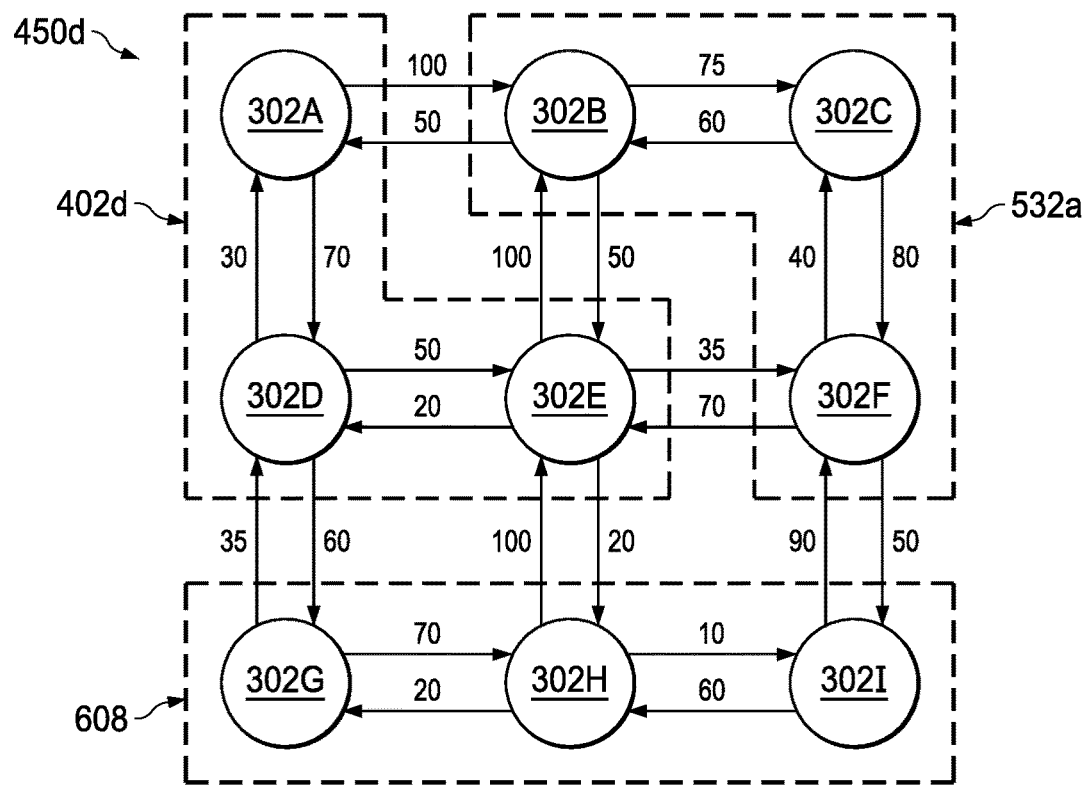

Referring to FIG. 6F, the IMF engine 202 identifies the node 302g as the subsequent node for identifying further sub-graphs for the graph partition 450d. As noted above, the sub-graph 402d includes the nodes 302a, 302d, 302e; and the sub-graph 532a includes the nodes 302b, 302c, 302f. To that end, the IMF engine 202 identifies sub-graphs using node 302g as the subsequent node, and finds all sub-graphs that includes node 302g and that includes three total nodes 302, where each of the nodes 302 is neighboring to the node 302g, and does not overlap with the sub-graphs 402d, 532a. Specifically, the IMF engine 202 can then identify the sub-graph 608 of the graph partition 450d that includes the nodes 302g, 302h, 302i.

Figure 6G:
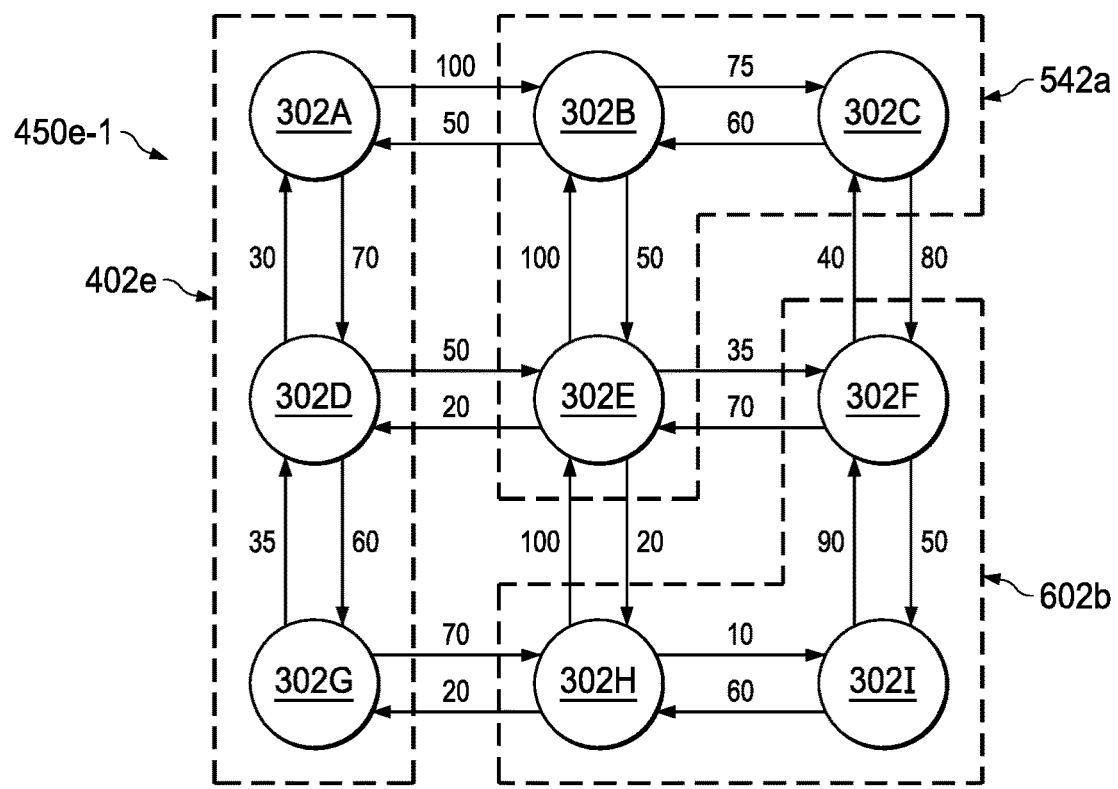

Referring to FIG. 6G, the IMF engine 202 identifies the node 302f as the subsequent node for identifying further sub-graphs for the graph partition 450e-1. As noted above, the sub-graph 402e includes the nodes 302a, 302d, 302g; and the sub-graph 542a includes the nodes 302b, 302c, 302e. To that end, the IMF engine 202 identifies sub-graphs using node 302f as the subsequent node, and finds all sub-graphs that includes node 302f and that includes three total nodes 302, where each of the nodes 302 is neighboring to the node 302f, and does not overlap with the sub-graphs 402e, 542a. Specifically, the IMF engine 202 can then identify the sub-graph 602b of the graph partition 450e-1 that includes the nodes 302f, 302h, 302i.

Figure 6H:
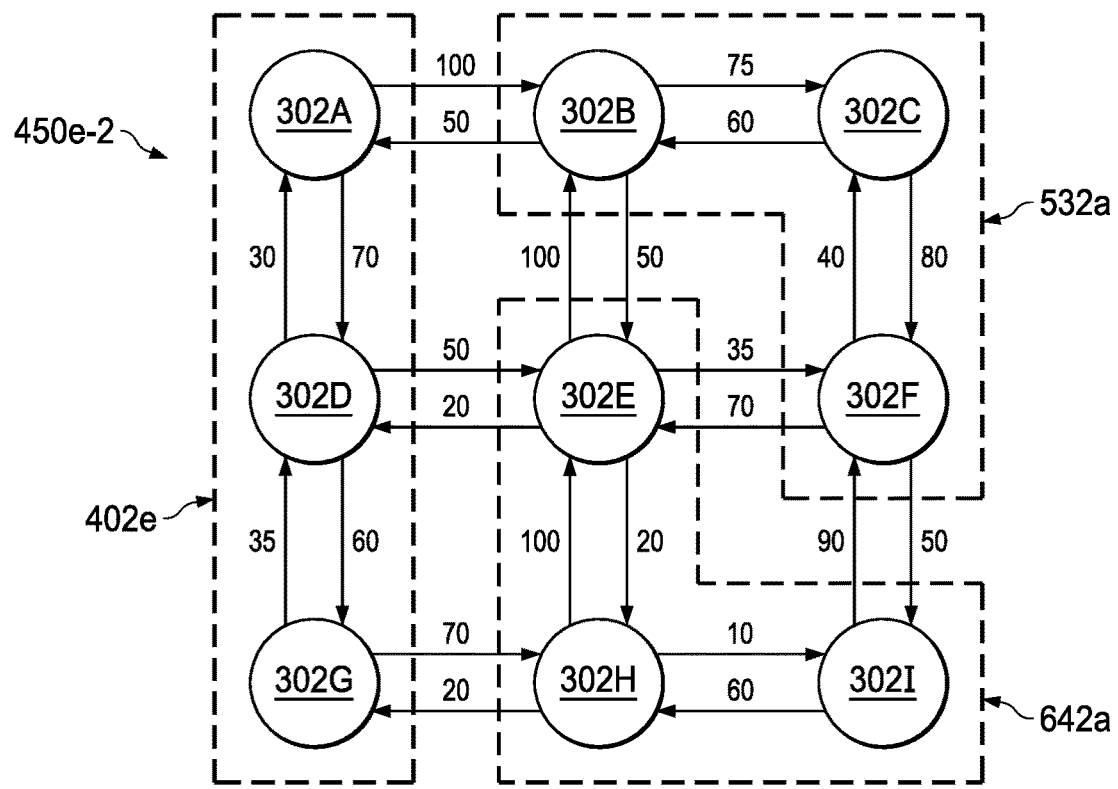

Referring to FIG. 6H, the IMF engine 202 identifies the node 302e as the subsequent node for identifying further sub-graphs for the graph partition 450e-2. As noted above, the sub-graph 402e includes the nodes 302a, 302d, 302g; and the sub-graph 532a includes the nodes 302b, 302c, 302f. To that end, the IMF engine 202 identifies sub-graphs using node 302e as the subsequent node, and finds all sub-graphs that includes node 302e and that includes three total nodes 302, where each of the nodes 302 is neighboring to the node 302e, and does not overlap with the sub-graphs 402e, 532a. Specifically, the IMF engine 202 can then identify the sub-graph 642a of the graph partition 450e-2 that includes the nodes 302e, 302h, 302i.

Figure 6I:
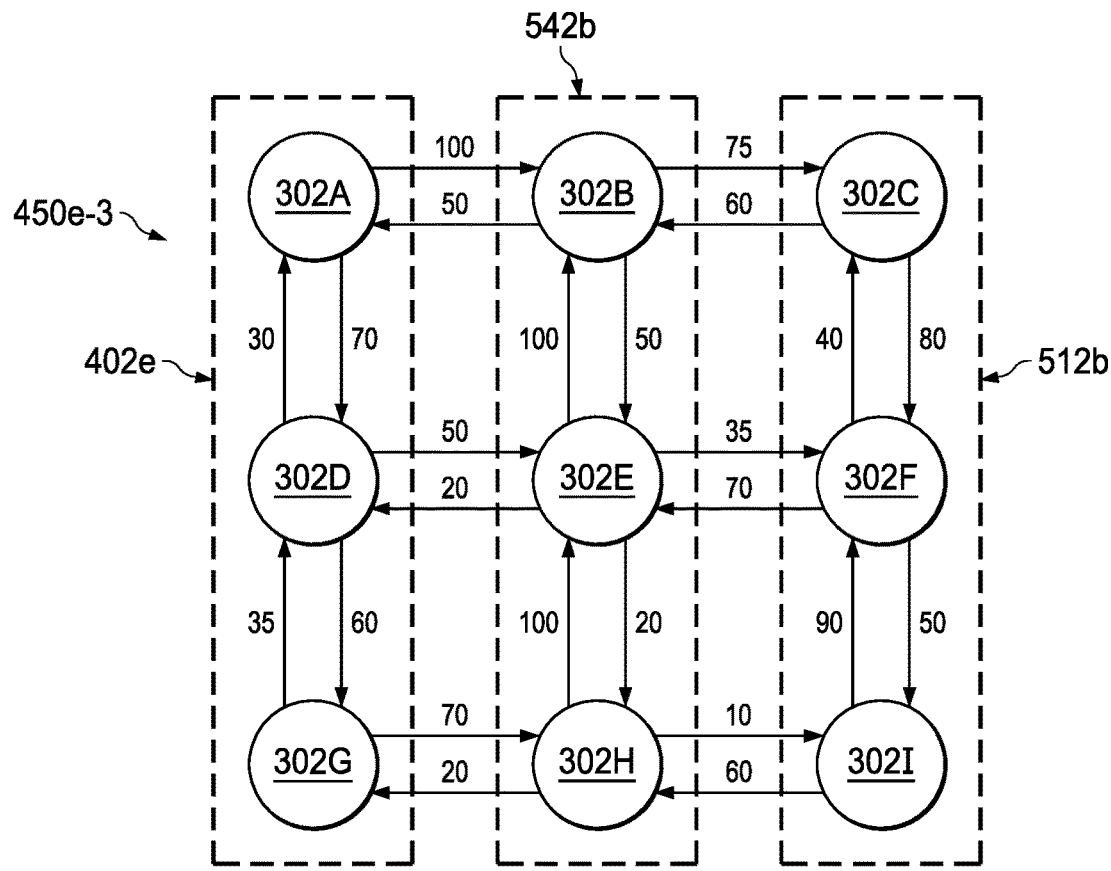

Referring to FIG. 6I, the IMF engine 202 identifies the node 302c as the subsequent node for identifying further sub-graphs for the graph partition 450e-3. As noted above, the sub-graph 402e includes the nodes 302a, 302d, 302g; and the sub-graph 542b includes the nodes 302b, 302e, 302e. To that end, the IMF engine 202 identifies sub-graphs using node 302c as the subsequent node, and finds all sub-graphs that includes node 302c and that includes three total nodes 302, where each of the nodes 302 is neighboring to the node 302c, and does not overlap with the sub-graphs 402e, 542b. Specifically, the IMF engine 202 can then identify the sub-graph 512b of the graph partition 450e-3 that includes the nodes 302c, 302f, 302i.

In summary, the IMF engine 202 partitions the directed graph 300 in to graph partitions 450a-1, 450a-2, 450b-1, 450b-2, 450c, 450d, 450e-1, 450e-2, and 450e-3 (collectively referred to as graph partitions 450). Each graph partition 450 includes a plurality of sub-graphs. Specifically, the graph partition 450a-1 includes sub-graphs 402a, 502a, 602a (shown in FIG. 6A); the graph partition 450a-2 includes sub-graphs 402a, 502b, 602b (shown in FIG. 6B); the graph partition 450b-1 includes sub-graphs 402b, 512a, 604a (shown in FIG. 6C); the graph partition 450b-2 includes sub-graphs 402b, 512b, 604b (shown in FIG. 6D); the graph partition 450c includes sub-graphs 402c, 512b, 606 (shown in FIG. 6E); the graph partition 450d includes sub-graphs 402d, 532a, 608 (shown in FIG. 6F), the graph partition 450e-1 includes sub-graphs 402e, 542a, 602b (shown in FIG. 6G), the graph partition 450e-2 includes sub-graphs 402e, 532a, 642a (shown in FIG. 6H), and the graph partition 450e-3 includes sub-graphs 402e, 542b, 512b (shown in FIG. 6I). Each of the graphs partitions 450 includes a totally of the nodes 302. Further, for each graph partition 450, each sub-graph of the graph partition 450 includes nodes 302 that represent geographical region sub-regions 122.

In some implementations, the IMF engine 202 calculates, for each sub-graph of each graph partition 450, a net traffic flow for the sub-graph based on a difference of the first traffic data 230a and the second traffic data 230b of the sub-regions 122 that corresponds to the nodes 302 of the sub-graph. The IMF engine 202 can calculate the net traffic for the graph partitions 450 based on a difference of the traffic flows between each sub-graph. For example, for the graph partition 450a-1 of FIG. 6A, the net traffic flow for the sub-graph 402a is 30. Specifically, the first traffic data associated with the sub-graph 402a is the summation of the first traffic data 230a associated with the number of computing devices 204 traveling from the sub-regions 122 corresponding to each of the nodes 302a, 302b, 302c. For example, the first traffic data 230a associated with the node 302a is 70; the first traffic data 230a associated with the node 302b is 50; and the first traffic data 230a associated with the node 302c is 80. The second traffic data 230b associated with the sub-graph 402a is the summation of the second traffic data 230b associated with the number of computing devices 204 traveling to the sub-regions 122 corresponding to each of the nodes 302a, 302b, 302c. For example, the second traffic data 230b associated with the node 302a is 30; the second traffic data 230b associated with the node 302b is 100; and the second traffic data 230b associated with the node 302c is 40. The difference between the first traffic data 230a and the second traffic data 230b for the sub-graph 402a is 30 (absolute value of the difference).

Continuing the example, the net traffic flow for the sub-graph 502a is 125. Specifically, the first traffic data 230a associated with the sub-graph 502a is the summation of the first traffic data 230a associated with the number of computing devices 204 traveling from the sub-regions 122 corresponding to each of the nodes 302d, 302e, 302f. For example, the first traffic data 230a associated with the node 302d is 30 and 60; the first traffic data 230a associated with the node 302e is 100 and 20; and the first traffic data 230a associated with the node 302f is 40 and 50. The second traffic data 230b associated with the sub-graph 502a is the summation of the second traffic data 230b associated with the number of computing devices 204 traveling to the sub-regions 122 corresponding to each of the nodes 302d, 302e, 302f. For example, the second traffic data 230b associated with the node 302d is 70 and 35; the second traffic data 230b associated with the node 302e is 100 and 50; and the second traffic data 230b associated with the node 302f is 80 and 90. The difference between the first traffic data 230a and the second traffic data 230b for the sub-graph 502a is 125 (absolute value of the difference).

Continuing the example, the net traffic flow for the sub-graph 602a is 95. Specifically, the first traffic data 230a associated with the sub-graph 602a is the summation of the first traffic data 230a associated with the number of computing devices 204 traveling from the sub-regions 122 corresponding to each of the nodes 302g, 302h, 302i. For example, the first traffic data 230a associated with the node 302g is 35; the first traffic data 230a associated with the node 302h is 100; and the first traffic data 230a associated with the node 302i is 90. The second traffic data 230b associated with the sub-graph 602a is the summation of the second traffic data 230b associated with the number of computing devices 204 traveling to the sub-regions 122 corresponding to each of the nodes 302g, 302h, 302i. For example, the second traffic data 230b associated with the node 302g is 60; the second traffic data 230b associated with the node 302h is 20; and the second traffic data 230b associated with the node 302i is 50. The difference between the first traffic data 230a and the second traffic data 230b for the sub-graph 602a is 95 (absolute value of the difference).

To that end, the IMF engine 202 similarly calculates the net traffic flow (absolute value) for each sub-graph of each of the graph partitions 450a-2, 450b-1, 450b-2, 450c, 450d, 450e-1, 450e-2, and 450e-3. To that end, the IMF engine 202 can calculate the net traffic flow for the sub-graphs 402a, 502b, 602b of graph partition 450a-2 as 30, 55, 25, respectively; the net traffic flow for the sub-graphs 402b, 512a, 604a of the graph partition 450b-1 as 20, 115, 95, respectively; the net traffic flow for the sub-graphs 402b, 512b, 604b for the graph partition 450b-2 as 20, 70, 90, respectively; the net traffic flow of the sub-graphs 402c, 512b, 606 for the graph partition 450c as 90, 70, 20, respectively; the net traffic flow of the sub-graphs 402d, 532a, 608 of the graphic partition 450d as 10, 105, 95, respectively; the net traffic flow of the sub-graphs 402e, 542a, 602b of the graphic partition 450e-1 as 130, 155, 25, respectively; the net traffic flow of the sub-graphs 402e, 532a, 642a of the graphic partition 450e-2 as 130, 105, 25, respectively; and the net traffic flow of the sub-graphs 402e, 542b, 512b of the graphic partition 450e-3 as 130, 200, 70, respectively.

In some implementations, the IMF engine 202 calculates, for each graph partition 450, a net traffic flow for the graph partition 450 based on a summation of the net traffic flow for each sub-graph of the graph partition 450. For example, the IMF engine 202 calculates for the graph partition 450a-1, the net traffic flow for the graph partition 450a-1 as the summation of the net traffic flow for each of the sub-graphs 402a, 502a, 602a—30, 125, 95, respectively. Thus, the summation of the net traffic flow for each of the sub-graphs 402a, 502a, 602a is 250. To that end, the IMF engine 202 similarly calculates the net traffic for the graph partitions 450a-2, 450b-1, 450b-2, 450c, 450d, 450e-1, 450e-2, 450e-3 as 110, 230, 180, 180, 210, 310, 260, 400, respectively.

In some implementations, the IMF engine 202 identifies a particular graph partition 450 as having a smallest net traffic flow from among the net traffic flows of each of the graph partitions 450. In short, the IMF engine 202 can compare the net traffic flows from each of the graph partitions 450a-1, 450a-2, 450b-1, 450b-2, 450c, 450d, 450e-1, 450e-2, 450e-3 to identify the smallest net traffic flow. For example, each of the graph partitions 450a-1, 450a-2, 450b-1, 450b-2, 450c, 450d, 450e-1, 450e-2, 450e-3 can have net traffic flows of 250, 110, 230, 180, 180, 210, 310, 260, 400, respectively. To that end, the IMF engine 202 identifies the graph partition 450a-2 as having the smallest net traffic flow (110). Specifically, by identifying the graph partition 450a-2 as the smallest net traffic flow, the allocation of resources—the central units 104 and the distributed units 102—is able to handle a peak load of computing devices 204 communicating with the RAN 100, including providing computational resources to the computing devices 204.

In some implementations, the IMF engine 202 can assign each central unit 104 to a respective sub-region 122 that corresponds to the sub-graphs of the graph partition 450a-2. For example, the IMF engine 202 can assign respective central units 104 to each of the sub-regions 402a, 502b, 602b of the graph partition 450a-2. In other words, the distributed units 102 can be grouped based on the graph partition 450a-2, and specifically, based on the sub-graphs 402a, 502b, 602b of the graph partition 450a-2. Specifically, the distributed units 102 that serve the sub-regions 122 that correspond to the nodes 302a, 302b, 302c of the sub-graph 402a are connected to a first central unit 104; the distributed units 102 that serve the sub-regions 122 that correspond to the nodes 302d, 302e, 302g of the sub-graph 502b are connected to a second central unit 104; and the distributed units 102 that serve the sub-regions 122 that correspond to the nodes 302f, 302h, 302i of the sub-graph 602b are connected to a third central unit 104.

To that end, by assigning the central units 104 to the respective sub-regions 122 that corresponds to the sub-graphs of the graph partition 450a-2, the RAN 100 is able to allocate the resources of the central units 104 more efficiently to handle peak loads of computational resources that are to be provided to the computing devices 204 by the RAN 100.

In some examples, the IMF engine 202 can receive, from one of the computing devices 204 within a particular sub-region 122, a computational task. Such computational tasks can include offloading off computing processing by the computing device 204. The IMF engine 202 can identify, based on the graph partition 450a-2, a corresponding central unit 104 that is associated with the particular sub-graph that includes the particular sub-region 122. For example, the IMF engine 202 can determine that the computing device 204 is located within a particular sub-region 122 that corresponds to the node 302a. The IMF engine 202 determines the distributed unit 102 that serves the sub-region 122 that corresponds to the node 302a, and further, the central unit 104 that is associated with that distributed unit 102. The corresponding central unit 104 can facilitate performance of the computational task, including performing such at a multi-access edge computing (MEC) that is included by the corresponding central unit 104.

Figure 7:
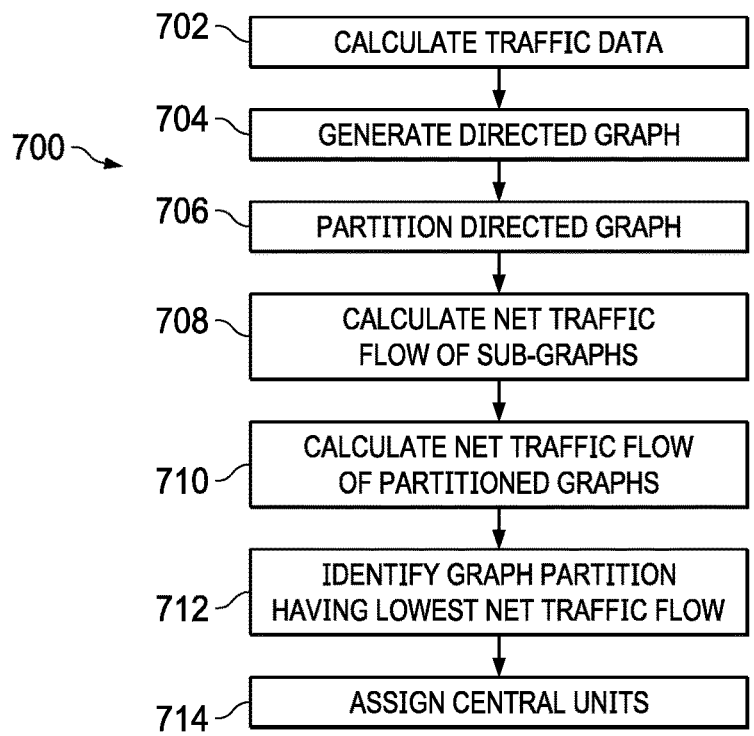
FIG. 7 illustrates a flowchart for distribution of the computing resources of the RAN.

FIG. 7 illustrates a flowchart depicting selected elements of an embodiment of a method 700 for distribution of the computing resources of the RAN 100. The method 700 may be performed by the environment 200 and/or the IMF engine 202 described herein with reference to FIGS. 1 and 2. It is noted that certain operations described in method 700 may be optional or may be rearranged in different embodiments.

The IMF engine 202 can calculate, for each pair of neighboring sub-regions 122, i) first traffic data 230a of computing devices 204 traveling from a first sub-region of the neighboring sub-regions 122 to a second sub-region of the neighboring sub-regions 122 and ii) second traffic data 230b of computing devices 204 traveling from the second sub-region of the neighboring sub-regions 122 to the first sub-region of the neighboring sub-regions 122 (702). The IMF engine 202 can generate a directed graph 240 that represents the service region 120 (704). The directed graph 240 includes a plurality of nodes representing the sub-regions 122 and the links between the nodes representing the traffic data 230. The IMF engine 202 partitions the directed graph 300 into graph partitions 450 (706). Each graph partition 450 includes a plurality of sub-graphs. Each of the graphs partitions 450 includes a totally of the nodes 302. Further, for each graph partition 450, each sub-graph of the graph partition 450 includes nodes 302 that represent geographical region sub-regions 122.

The IMF engine 202 calculates, for each sub-graph of each graph partition 450, a net traffic flow for the sub-graph based on a difference of the first traffic data 230a and the second traffic data 230b of the sub-regions 122 that corresponds to the nodes 302 of the sub-graph (708). The IMF engine 202 calculates, for each graph partition 450, a net traffic flow for the graph partition 450 based on a summation of the net traffic flow for each sub-graph of the graph partition 450 (710). The IMF engine 202 identifies a particular graph partition 450 as having a smallest net traffic flow from among the net traffic flows of each of the graph partitions 450 (712). In short, the IMF engine 202 can compare the net traffic flows from each of the graph partitions 450 to identify the smallest net traffic flow. The IMF engine 202 can assign each central unit 104 to a respective sub-region 122 that corresponds to the sub-graphs of the graph partition 450 having the smallest net traffic flow (714).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   identifying, by an inter-group minimal flow (IMF) engine, a service region that includes a plurality of sub-regions, each sub-region served by a corresponding distributed unit of a radio access network (RAN), wherein each central unit of a plurality of central units of the RAN can support a particular number of distributed units;
   calculating, for each pair of neighboring sub-regions, i) first traffic data of computing devices traveling from a first sub-region of the neighboring sub-regions to a second sub-region of the neighboring sub-regions, and ii) second traffic data of the computing devices traveling from the second sub-region of the neighboring sub-regions to the first sub-region of the neighboring sub-regions;
   generating, by the IMF engine, a directed graph representing the service region, the directed graph including a plurality of nodes representing the sub-regions and the links between the nodes representing the first and the second traffic data;
   partitioning the directed graph into a plurality of graph partitions, each graph partition including a plurality of sub-graphs, each graph partition including a totality of the nodes, wherein for each graph partition, each sub-graph of the graph partition includes one or more nodes that represent neighboring geographic sub-regions;
   calculating, for each sub-graph of each graph partition, a net traffic flow for the sub-graph based on a difference of the first and the second traffic data of the sub-regions that correspond to the nodes of the sub-graph;
   calculating, for each graph partition, a net traffic flow for the graph partition based on a summation of the net traffic flow of each sub-graph of each graph partition;
   identifying a particular graph partition having a smallest net traffic flow from among the net traffic flows of each of the graph partitions; and
   assigning, by the IMF engine, each central unit of the plurality of central units of the RAN to a respective sub-region that corresponds to the sub-graphs of the particular graph partition.

2. The computer-implemented method of claim 1, wherein the number of nodes of each sub-graph is based on the particular number of distributed units that each central unit can support.

3. The computer-implemented method of claim 1, wherein the computing units are associated with automobiles.

4. The computer-implemented method of claim 1, further comprising:
   receiving, from a computing device within a particular geographic sub-region, a computational task;
   identifying, based on the particular graph partition, a corresponding central unit associated with the sub-graph that includes the particular geographic region; and
   facilitating performance of the computational task by the corresponding central unit.

5. The computer-implemented method of claim 4, wherein the corresponding central unit includes multi-access edge computing (MEC) to facilitate performance of the computational task.

6. The computer-implemented method of claim 1, wherein the first traffic data includes an average transition rate of the computing devices traveling from the first sub-region to the second sub-region over a period of time; and the second traffic data includes an average transition rate of the computing devices traveling from the second sub-region to the first sub-region over the same period of time.

7. The computer-implemented method of claim 1, wherein, for each graph partition, each sub-graph of the graph partition is distinct, and non-overlapping from each remaining sub-graph of the graph partition.

8. A system comprising a processor having access to memory media storing instructions executable by the processor to:
   identifying, by an inter-group minimal flow (IMF) engine, a service region that includes a plurality of sub-regions, each sub-region served by a corresponding distributed unit of a radio access network (RAN), wherein each central unit of a plurality of central units of the RAN can support a particular number of distributed units;
   calculating, for each pair of neighboring sub-regions, i) first traffic data of computing devices traveling from a first sub-region of the neighboring sub-regions to a second sub-region of the neighboring sub-regions, and ii) second traffic data of the computing devices traveling from the second sub-region of the neighboring sub-regions to the first sub-region of the neighboring sub-regions;
   generating, by the IMF engine, a directed graph representing the service region, the directed graph including a plurality of nodes representing the sub-regions and the links between the nodes representing the first and the second traffic data;
   partitioning the directed graph into a plurality of graph partitions, each graph partition including a plurality of sub-graphs, each graph partition including a totality of the nodes, wherein for each graph partition, each sub-graph of the graph partition includes one or more nodes that represent neighboring geographic sub-regions;
   calculating, for each sub-graph of each graph partition, a net traffic flow for the sub-graph based on a difference of the first and the second traffic data of the sub-regions that correspond to the nodes of the sub-graph;

calculating, for each graph partition, a net traffic flow for the graph partition based on a summation of the net traffic flow of each sub-graph of graph partition;

identifying a particular graph partition having a smallest net traffic flow from among the net traffic flows of each of the graph partitions; and assigning, by the IMF engine, each central unit of the plurality of central units of the RAN to a respective sub-region that corresponds to the sub-graphs of the particular graph partition.

9. The system of claim 8, wherein the number of nodes of each sub-graph is based on the particular number of distributed units that each central unit can support.

10. The system of claim 8, wherein the computing units are associated with automobiles.

11. The system of claim 8, the operations further comprising:

receiving, from a computing device within a particular geographic sub-region, a computational task;

identifying, based on the particular graph partition, a corresponding central unit associated with the sub-graph that includes the particular geographic region; and facilitating performance of the computational task by the corresponding central unit.

12. The system of claim 11, wherein the corresponding central unit includes multi-access edge computing (MEC) to facilitate performance of the computational task.

13. The system of claim 8, wherein the first traffic data includes an average transition rate of the computing devices traveling from the first sub-region to the second sub-region over a period of time; and the second traffic data includes an average transition rate of the computing devices traveling from the second sub-region to the first sub-region over the same period of time.

14. The system of claim 8, wherein, for each graph partition, each sub-graph of the graph partition is distinct, and non-overlapping from each remaining sub-graph of the graph partition.

* * * * *